United States Patent Office 3,081,327
Patented Mar. 12, 1963

3,081,327
ORGANIC ANTIMONY-PHOSPHORUS COMPOUNDS
Gail H. Birum and George A. Richardson, Dayton, Ohio, assignors to Monsanto Chemical Company, St. Louis, Mo., a corporation of Delaware
No Drawing. Filed Mar. 7, 1960, Ser. No. 12,908
29 Claims. (Cl. 260—446)

The present invention relates to new organic compounds containing both antimony and phosphorus. More particularly, this invention relates to phosphorus-containing esters of trivalent antimony acids.

It is an object of this invention to provide new and useful antimony compounds containing phosphinylhydrocarbyloxy radicals. It is a further obpect of this invention to provide methods of making antimony compounds containing phosphinylhydrocarbyloxy radicals. These and other objects will become apparent as the description of the invention progresses.

In general, this invention is directed to esters of trivalent antimony acids and alpha-hydroxyhydrocarbyl pentavalent phosphorus esters. These compounds can be prepared by reaction of a trivalent antimony compound containing at least one bromine or chlorine atom attached to antimony with an aldehyde and a trivalent phosphorus ester having at least one alkoxy or haloalkoxy radical. During the course of this reaction the trivalent phosphorus atom of the phosphorus ester is converted to the pentavalent state, gives up one alkyl or haloalkyl radical and becomes attached to the carbonyl carbon atom of the aldehyde, thus forming a phosphinylhydrocarbyloxy radical which replaces a bromine or chlorine atom attached to the antimony atom. The alkyl radical given up by the trivalent phosphorus ester and the bromine or chlorine atom given up by the antimony compound form an alkyl or haloalkyl bromide or chloride compound which is a by-product. Alternatively, the compounds of this invention may be prepared by reacting the trivalent antimony compound containing at least one bromine or chlorine atom with an alpha-hydroxyhydrocarbyl phosphorus ester in the presence of a basic material.

More specifically this invention provides esters of trivalent antimony acids having at least one phosphinylhydrocarbyloxy group, each of the two remaining valences of the antimony atom being satisfied by another phosphinylhydrocarbyloxy group of the same or different type, bromine, chlorine, hydrogen, hydrocarbon derivatives such as hydrocarbyl, hydrocarbyloxy, hydrocarbylthio radicals or such radicals carrying halogen substituents. The hydrocarbyl, hydrocarbyloxy, hydrocarbylthio radicals and such radicals carrying halogen substituents, including fluorine, bromine, chlorine, and iodine, include aliphatic and aromatic radicals which may contain olefin unsaturation and which may have from 1 to 20 carbon atoms or more. However it is usually preferred to use antimony halide reactants with such radicals having from 1 to 12 carbon atoms.

The compounds of this invention are phosphinylhydrocarbyloxy esters of stibenous, stibonous, and stibinous acids having the general formula

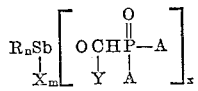

wherein $n$ is a whole number of from 0 to 2, $m$ is a whole number of from 0 to 2, $x$ is a whole number of from 1 to 3, and the sum total of $n+m+x$ is always equal to 3; each R is selected from the group consisting of hydrogen, hydrocarbyl, hydrocarbyloxy, hydrocarbylthio radicals having from 1 to 20 carbon atoms, preferably from 1 to 12 carbon atoms, and said radicals having halogen substituents therein; X is selected from the group consisting of bromine and chlorine; Y is selected from the group consisting of hydrogen, hydrocarbyl radicals having from 1 to 17 carbon atoms, furyl, thienyl, said radicals carrying a substituent selected from the group consisting of halogen, cyano-, -alkyl, -O-alkyl, -S-alkyl, -COOalkyl, where alkyl has from 1 to 5 carbon atoms, and

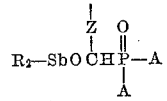

where Z is a bivalent hydrocarbylene radical having from 1 to 18 carbon atoms when $x$ is 1, and when $x$ is 2 to 3, Y is selected from the group consisting of hydrogen, hydrocarbyl radicals having from 1 to 11 carbon atoms, furyl, thienyl, and said radicals carrying a substituent selected from the group consisting of halogen, cyano, -alkyl, -O-alkyl, -S-alkyl, and -COOalkyl, where alkyl has from 1 to 5 carbon atoms; and each A is selected from the group consisting of hydrocarbyl, hydrocarbyloxy radicals, of from 1 to 20 carbon atoms, preferably from 1 to 12 carbon atoms, and said radicals having halogen substituents therein.

The phosphinylhydrocarbyloxy radicals discussed in this specification constitute that portion of the compounds of this invention represented by the formula

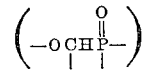

wherein the indicated free valences of the carbon and phosphorus atoms are satisfied as described above.

The preferred method for preparing the compounds of this invention is that which involves the reaction of a trivalent antimony compound having from one to three bromine or chlorine atoms attached to the antimony atom, an aldehyde, and a trivalent phosphorus ester compound which has at least one alkoxy or haloalkoxy group linked to the phosphorus atom. The product obtained will depend upon the molar proportions of the reactants used; i.e., the number of phosphinylhydrocarbyloxy radicals present in the compounds of this invention depends upon the number of halogen atoms attached to the antimony atom in the halogen-containing antimony reactant which are replaced. When only one halogen thus attached is replaced a product containing one phosphinylhydrocarbyloxy group is obtained, for example, as follows:

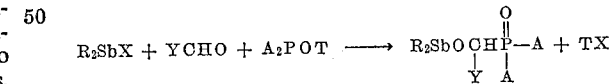

wherein R, X, Y, and A are as defined above and T is selected from the group consisting of alkyl and haloalkyl radicals having from 1 to 12 carbon atoms.

When two halogens are attached to the antimony atom, they can both be replaced by using two moles each of the carbonyl compound and trivalent phosphorus ester. Thus, the reaction may be:

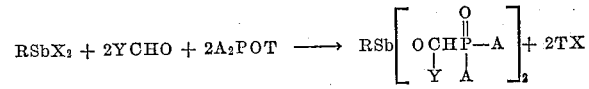

wherein the product has two phosphinylhydrocarbyloxy groups, or by using only one molar proportion each of aldehyde and trivalent phosphorus ester the reaction may be as follows:

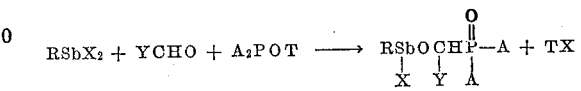

wherein the product contains one halogen atom attached to the antimony atom and one phosphinylhydrocarbyloxy group. When three halogen atoms are attached to the antimony atom, all three may react as follows:

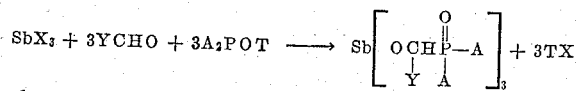

where the product contains three phosphinylhydrocarbyloxy groups, or the reaction may be limited to replacement of two halogen atoms,

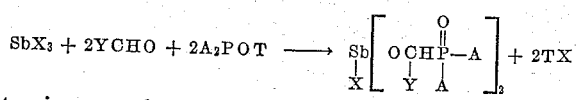

to give a product containing one halogen atom attached to the antimony atom and two phosphinylhydrocarbyloxy groups, or to replacement of one halogen atom,

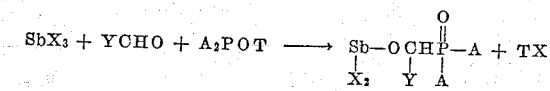

to give a product containing two halogen atoms attached to the antimony atom and one phosphinylhydrocarbyloxy group, each reaction being accomplished by controlling the molar proportions of aldehyde and trivalent phosphorus ester that are used to displace the halogen atoms from the antimony atom.

It is also within the scope of this invention to replace each halogen in the antimony trihalide or antimony dihalide reactant with a different phosphinylhydrocarbyloxy radical by replacing the halogens, one at a time, as above, with a different aldehyde and trivalent phosphorus ester. Thus by following the route indicated in the above paragraph for replacing one halogen atom by reacting one mole of aldehyde and one mole of trivalent phosphorus ester with one mole of, say, an antimony trihalide, and then adding one mole each of a different aldehyde and trivalent phosphorus ester for each halogen to be replaced, the reaction products can be varied extensively. For example, by reacting antimony trichloride first with one mole each of acetaldehyde and triethyl phosphite until reaction is complete, then with one mole each of propionaldehyde and diethyl ethylphosphonite until reaction is complete and finally with one mole each of butyraldehyde and ethyl diethylphosphinite, there is produced 1-(diethoxyphosphinyl)ethyl 1-(ethylethoxyphosphinyl)-propyl 1-(diethylphosphinyl)butyl antimonite. The structural formula for such compound is

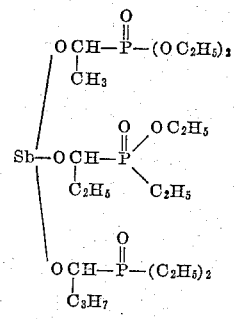

Among the antimony halide reactants that can be used in this invention are compounds of the following general formulae:

| | |
|---|---|
| $SbX_3$ | $(XR')_2SbX$ |
| $R'SbX_2$ | $R'(R'O)SbX$ |
| $R'OSbX_2$ | $R'(R'S)SbX$ |
| $R'SSbX_2$ | $R'(XR')SbX$ |
| $XR'SbX_2$ | $(R'O)(R'S)SbX$ |
| $XR'OSbX_2$ | $(R'O)(XR')SbX$ |
| $XR'SSbX_2$ | $(R'O)(XR'O)SbX$ |
| | $(R'O)(XR'S)SbX$ |
| $R_2SbX$ | $(R'S)(XR')SbX$ |
| $(R'O)_2SbX$ | $(R'S)(XR'O)SbX$ |
| $(R'S)_2SbX$ | $(R'S)(XR'S)SbX$ | where R' represents hydrocarbyl radicals of from 1 to 12 carbon atoms, XR' represents halohydrocarbyl radicals of from 1 to 12 carbon atoms, and X represents chlorine or bromine. The hydrocarbyl radicals may be aliphatic or aromatic; they may be saturated or unsaturated. Examples of hydrocarbyl and halohydrocarbyl radicals included in the above definition are alkyl, alkenyl, alkynyl, cycloalkyl, aryl, alkaryl, aralkyl, and their halogen derivatives. The above list of antimony halide reactants is not exhaustive of all variations but is intended only to show how the antimony valences may be satisfied for use in this invention.

Examples of antimony trihalides, $SbX_3$, that can be used in the present invention are, of course, antimony trichloride, antimony tribomide, and the mixed antimony bromochlorides.

Examples of compounds of the formula $RSbX_2$ which are useful in this invention are dibromo- and dichlorostibines and any of the following: methyl-, ethyl-, n-propyl-, isopropyl-, n-butyl-, isobutyl-, amyl-, isoamyl-, n-hexyl-, n-heptyl-, decyl-, undecyl-, 2-ethylhexyl-, 4-methyloctyl-, propenyl-, hexenyl-, vinyl-, allyl-, 4-heptenyl-, propynyl-, heptynyl-, decynyl-, cyclopentyl-, cyclohexyl-, cyclobutyl-, phenyl-, 4-ethylphenyl-, 4-heptenyloxyphenyldibromo-, and -dichlorostibines, and dibromo- and -dichlorostibines having such radicals carrying halogen substituents.

Examples of the presently useful hydrocarbyloxy and halohydrocarbyloxy dihalostibines are, e.g. methoxy-, ethoxy-, vinyloxy-, propoxy-, isopropoxy-, allyloxy-, propynyloxy-, n-butoxy-, tert-butoxy-, 2-butenyloxy-, amyloxy-, isoamyloxy-, n-hexyloxy-, 5-hexenyloxy-, n-heptyloxy, n-heptynyloxy-, 2-ethyl-hexyloxy-, isononyloxy-, n-undecyloxy-, n-dodecyloxy-, 11-dodecenyloxy-, 2-chloroethoxy-, 5-chloro-2-pentynyloxy-, 2-fluoroethoxy-, tetrachlorobutoxy-, tribromopropoxy-, 2-iodopropoxy-, 2,4-dichlorophenoxy-, 2-chloro-p-tolyloxy-, cyclohexyloxy-, cyclopentyloxy-, 4-methoxyphenoxy-, p-pentylphenoxy-, α-naphthyl-oxydichloro- and -dibromostibines.

Compounds of the formulae $R'SSbX$ and $XR'SSbX_2$ are hydrocarbylthiodihalostibines and halohydrocarbylthiodihalostibines in which the hydrocarbyl group is as defined above. Such compounds are for example, the alkylthio-, alkenylthio- and alkynylthiodihalostibines such as methylthio-, ethylthio-, 2-pentenylthio-, 4-octynylthio-, 8-dodecenylthio-, n-butylthio-, cyclohexylthiodibromo- and -dichlorostibines. Examples of aromatic hydrocarbylthio and halohydrocarbylthiodibromo- and -dichlorostibines are, e.g., phenylthio-, p-tolylthio-, benzylthio-, 2-naphthylthio-, 4-ethylphenylthio-, 2,4,6-trimethylphenylthio-, 4-chlorophenylthio-, 2-chlorophenylthio-, 2,4-dichlorophenylthio-, 4-iodobenzylthiodibromo- and -dichlorostibines.

Compounds of the formulae $R'_2SbX$, $R'(R'O)SbX$, $R'(R'S)SbX$, $(R'O)_2SbX$, $(R'S)_2SbX$, $(R'S)(R'O)SbX$ and the halogen substituted derivatives thereof in which R' is as defined above in detail for compounds of the formulae $R'SbX_2$, $R'OSbX_2$, and $R'SSbX_2$ may also be used in this invention, a few examples of aliphatic halostibines which are suited for the present purpose are dihydrocarbyl- and dihydrocarbyloxyhalostibines, that is, compounds of the formulae:

| | |
|---|---|
| $(alkyl)_2SbX$ | $(alkyl-O-)_2SbX$ |
| $(alkenyl)_2SbX$ | $(alkenyl-O-)_2SbX$ |
| $(alkynyl)_2SbX$ | $(alkynyl-O-)_2SbX$ | in which alkyl, alkenyl, and alkynyl radicals have from 1 to 12 carbon atoms and X is chlorine or bromine. For example, dimethyl-, diethyl-, diisopropyl-, di-n-butyl-, dimethoxy-, diethoxy-, diisopropoxy-, bis(2-propynyloxy)-, dibutyl-, di-n-amyl-, diisoamyl-, di-tert-butoxy-, di-n-amyloxy-, diisoamyloxy-, di-n-hexyl-, bis(2-hexenyl)-, di-n-heptyloxy-, bis(2-ethylhexyloxy)-, di-n-octyl-, diisononyl-, di-n-octyloxy-, di-n-decyl-, di-n-undecyl-, di-n-dodecyl-, di-tert-dodecyl-, di-n-decyloxy-, 3-ethyl-n-undecyloxychloro- and -bromostibines and the mixed esters such as propylbutoxychlorostibine, ethoxymethoxybromostibine, hexylhexyloxychlorostibine, 3-butenyloxyhexyloxybromostibine, etc., may be used.

The aliphatic radical from the dialkyl-, dialkyloxy-, dialkenyl-, dialkenyloxy-, dialkynyl-, and dialkynyloxychlorostibines and -bromostibines may contain one or more halogen atoms. Examples of such compounds are the simple esters such as bis(2-chloropropyl)-, bis(2-chloroethoxy)-, bis(2 - bromobutyl)-, bis(6-chloro-2-hexenyl)-, bis(2 - chloroheptyl)-, bis(4,4-dichlorooctyloxy)-chloro- and -bromostibines, and the mixed esters of both paraffinic and haloparaffinic alcohols such as (3-chloropropyl)ethylbromostibine, (2-chloroethoxy)methoxychlorostibine, and (2-chloropropoxy)ethylbromostibine.

Other compounds that may be used as the antimony halide reactants are those resulting from the reaction of a saturated or unsaturated oxirane or glycidyl ether compound with an antimony trihalide compound, for example, as by the following equation;

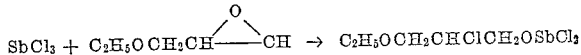

Oxirane compounds suitable for reaction with antimony trichloride or antimony tribromide to yield the halohydrocarbyloxydichloro- or -dibromostibine reactants are e.g., ethylene oxide and alkyl derivatives thereof such as propylene oxide, isobutylene oxide, 1,2-epoxybutane, 2,3-epoxybutane, 1,2-epoxy-pentane, 2,3-epoxypentane, 2,3-epoxyhexane, 1,2-epoxyhexane, 1,2-epoxyheptane, 2,3 - epoxy-3-ethylpentane, 1,2-epoxy-4-methylpentane, 1,2-epoxy-2,4,4-trimethylpentane; haloalkyl-substituted oxiranes such as epichlorohydrin, epibromohydrin, epiiodohydrin, epifluorohydrin, 1,2-epoxy-4-bromobutane, 2,3-epoxy-4-chlorobutane, 2,3-epoxy-1-bromopentane, 3,4-epoxy-2-chlorohexane, 1-bromo-2,3-epoxyheptane; the alkenyl-substituted oxiranes such as 3,4-epoxy-4-methyl-1-pentene, and 3,4-epoxy-1-butene; aryl-substituted oxiranes such as epoxyethylbenzene, (1,2-epoxy-1-methylethyl)benzene, (3-chloro-1,2-epoxypropyl)benzene and (1,2-epoxypropyl)benzene; alkoxyalkyl- and phenoxyalkyl-substituted oxiranes such as the methyl-, ethyl-, isopropyl-, isoamyl-, phenyl-, and 2-ethoxyethyl ethers of glycidol, i.e., compounds of the formula

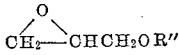

where R'' is a methyl, ethyl, isopropyl, amyl, phenyl, or 2-ethoxyethyl radical. The epoxides used can also contain substituent groups therein such as alkoxy, carboalkoxy, aryloxy, alkylmercapto, arylmercapto, cyano, halogen, etc.

Since reaction of the oxirane compound with the antimony trihalide proceeds through opening of the oxirane ring, there may be present in the reaction mixture minor amounts of isomeric halohydrocarbyloxychlorostibine compounds; e.g., while in the reaction of antimony trichloride or antimony tribromide and propylene oxide the oxirane ring opens with preferential formation of 2-chloropropoxydichlorostibine or bis(2-chloropropoxy)chlorostibine, depending upon the molar proportions used, there may also be formed small quantities of 1-methyl-2-chloroethoxydichlorostibine or bis(1-methyl-2-chloroethoxy)chlorostibine, respectively. The isomer content is of no consequence for the present purpose because the isomers also react with aldehyde and trivalent phosphorus esters to give the compounds of this invention. While the small quantity of isomeric compounds present in the final reaction product may be considered to constitute an impurity, it is not detrimental in practical application for the isomers are so closely related that they possess substantially the same utility. Thus the content of, say, a small quantity of the bis(1-methyl-2-chloroethoxy)chlorostibine in admixture with bis(2-chloropropoxy)chlorostibine when the latter compound is reacted with an aldehyde and the trivalent phosphorus ester does not limit the utility of the product obtained. However, if desired the isomeric impurity may be separated by generally known isolating procedures, e.g., chromotography, crystallization, etc.

Reaction of the antimony trichloride or antimony tribromide with the presently useful oxirane compounds takes place readily, generally by simply mixing the antimony halide with the oxirane compound in substantially equimolar proportions if one halogen atom is to be reacted; or with substantially two moles of the oxirane compound if two halogens are to be reacted. Depending on the nature of the individual reactants, heating may or may not be required. The addition of catalytic amounts of acids may be beneficial. Usually the reaction is exothermic, whereby cooling in order to maintain smooth reaction is advantageous. It is recommended that in such exothermic reactions the temperature be not allowed to rise above, say, from 60° C. to 80° C. An inert diluent may or may not be employed. Since the reaction between the antimony trihalide and the oxirane compound involves an addition reaction, no isolation procedure is required before reaction with the aldehyde and the trivalent phosphorus ester. The end of the reaction between the antimony halide and the oxirane compound can easily be determined, e.g., by noting cessation of change in refractive index, or of heat evolution in the case of exothermic reaction, or of change of viscosity of the reaction mass.

A class of aromatic antimony halides which are suited for the present purpose are the benzenoid dihydrocarbyloxyhalostibines, i.e., compounds of the formula

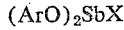

in which Ar is a benzenoid hydrocarbyl radical which contains from 6 to 12 carbon atoms and X is chlorine or bromine. Such compounds may be diaryloxy-, bis-(alkaryloxy)-, bis(aralkyloxy)-, aryloxyalkaryloxy-, aryloxyaralkyloxy-, alkaryloxyaralkyloxybromo- or -chlorostibines, e.g. diphenoxy-, di-p-tolyloxy-, di-α- or β-naphthyloxy-, dibiphenylyloxy-, dimesityloxy-, dicumyloxy-, bis(2-butylphenoxy)-, phenoxy-2-naphthyloxy-, biphenylyloxyphenoxy-, (4 - ethylphenoxy)phenoxy-, dibenzyloxy-, (2-ethylphenoxy)benzyloxy-, bis(2-ethylphenoxy)-, benzyloxyphenoxy-, biphenyloxy(4-ethylbenzyloxy)-, (3-phenylpropoxy)mesityloxy-, or β - naphthyloxyphenoxychlorostibine or -bromostibine.

The corresponding benzenoid hydrocarbylthiodihalostibines, i.e., compounds of the formulae $$ArSSbX_2$$
$$(Ar=S)_2SbX$$

wherein Ar and X are as defined above, are similarly valuable for the present purpose. Such compounds are, for example, bis(phenylthio)chlorostibine, bis(benzylthio)bromostibine, bis(β-naphthylthio)chlorostibine, biphenylthio(phenylthio)chlorostibine, benzylthio(α - naphthylmethylthio)bromostibine, (p-tolylthio)-2-phenylthylthiochlorostibine, etc.

Mixed hydrocarbylhalostibines, halohydrocarbylhalostibines, hydrocarbylthiohalostibines and halohydrocarbylthiohalostibines are likewise useful in the present invention. Such compounds are, for example, methylphenylchlorostibine, (2-propenyl)-p-tolylchlorostibine, (2-chloroethyl)-β-naphthylbromostibine, (benzylthio)ethylthiobromostibine, (2 - chlorophenyl) - 3 - butynylchlorostibine, n - butylcyclohexylthiochlorostibine, (2 - ethylhexyl)-2,3-dichlorophenylthiochlorostibine, etc.

Examples of hydrocarbylhydrocarbyloxyhalostibines, i.e., compounds of the formula

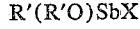

are the following: ethylethoxychlorostibine, vinylpropoxybromostibine, phenylhexyloxychlorostibine, mesitylphenoxychlorostibine, (3-butynyl)-4-pentenylchlorostibine, cyclohexylethoxybromostibine, 1-butoxycyclohexylchlorostibine, and naphthylpropynyloxychlorostibine. These compounds may have halogen substituted in one or both hydrocarbyl groups. For example, (2,2-dichloropropyl) - 2 -chloro - 4 - pentynyloxychlorostibine, and (2 - bromo - α - naphthyl) - 2,4,6 - tribromophenoxybromostibine, etc., may be used.

Also presently useful are the (hydrocarbyloxy) hydrocarbylthiohalostibine, i.e., compounds of the formula $$\underset{R'SSbX}{\overset{OR'}{|}}$$

where X and R' are as defined above. Such compounds are, for example, phenoxyphenylthio-, allyloxybutynylthio-, methoxyphenylthio-, β-naphthyloxy-β-naphthylthio-, ethoxyethylthio-, m-tolyloxy-m-tolylthio-, 4-chlorophenoxybiphenylylthio-, 2 -methyl - α -naphthyloxyphenylthio, O - β - naphthylmethyl - S - phenylthio-, O-heptyl S - (3 - cycloalkenyl)-, heptyloxy(3 - cyclohexenylthio-), butoxy-p-cumylthiochloro- or -bromostibines.

A very valuable class of halostibines useful in this invention are the dibromo- and -dichlorostibines which term includes the hydrocarbyl-, hydrocarbyloxy-, and hydrocarbylthiodibromo- and dichlorostibines and their halogen substitution products as well as the compounds dibromostibine, (Br$_2$SbH), and dichlorostibine (Cl$_2$SbH). Examples of such compounds are ethyldibromostibine, phenyldichlorostibine, 2 - chloropropyldichlorostibine, hexyloxydibromostibine, p-tolyloxydichlorostibine, 2,4-dibromobenzyloxydichlorostibine, decylthiodichlorostibine, 4 - ethylphenylthiodibromostibine, 8 - bromododecylthiodichlorostibine, 2-butenyldichlorostibine, 6-chloro-4 - hexenyldibromostibine, 2 - ethyl - 4 -octenyloxydichlorostibine, 4 - (2 - chlorovinyl)phenyloxydibromostibine, 3-hexnyloxydichlorostibine, etc.

Any of the above described antimony halide compounds can be reacted with an aldehyde compound and a trivalent phosphorus ester which has at least one alkoxy or haloalkoxy group linked to the phosphorus atom to give phosphorus containing esters of antimony compounds. In general, aldehydes having from 1 to 18 carbon atoms are used. However, the aldehydes are usually selected so as to minimize possible steric hindrance in the compound being prepared. Hence, while aldehyde compounds having up to 18 carbon atoms may be used, it is preferred to limit the number of carbon atoms in the aldehyde reactant to 12 carbon atoms when three halogen atoms of the antimony halide reactant are to be replaced. When only one or two halogen atoms of the antimony halide reactant are to be replaced, aldehyde compounds having up to 18 carbon atoms can readily be used.

Owing to their easy availability, a particularly useful class of aldehydes includes the aliphatic aldehydes of from 1 to 18 carbon atoms, e.g., formaldehyde, acetaldehyde, propionaldehyde, butyraldehyde, isobutyraldehyde, valeraldehyde, isovaleraldehyde, hexanal, heptanal, 2-ethylhexanal, octanal, 2-butyloctanal, 6-methylheptanal, decanal, undecanal, 2-methylundecanal, lauraldehyde, myristaldehyde, palmitaldehyde, stearaldehyde, etc.

The presence of cyano, halogen, alkoxy, carboalkoxy, and alkylthio substituents in the aldehyde has no effect on the course of the reaction; hence, there may be employed such substituted aldehydes as 3-cyanopropionaldehyde, chloroacetaldehyde, 3-butoxybutyraldehyde, 4-cyano-2-2-dimethylbutyraldehyde, 2,3-dichloropropionaldehyde, 3-isopropoxypionaldehyde, 3-ethylthio-3-methylbutyraldehyde, 2-methyl-3-fluoropropionaldehyde, dichlorolauraldehyde, ethyl 11-formylundecanoate, succinaldehydic acid methyl ester, ethyl 4-formylbutyrate, iodoacetaldehyde, dichloroacetaldehyde, chloral, etc.

Presently useful alicyclic carboxaldehydes include cyclohexanecarboxaldehyde, 6-methyl-3-cyclohexenecarboxaldehyde, 2 - cyclohexene - 1 - carboxaldehyde, cyclopentanecarboxaldehyde, 3 - isopropyl - 1 - methylcyclohexanecarboxaldehyde, 5-ethoxy-2-cyclopentene-1-carboxaldehyde, 2,2,6-trimethylcyclohexanecarboxaldehyde, 2,6-diethyl-2-cyclohexenecarboxaldehyde, etc.

Examples of unsaturated aliphatic and aromatic aldehydes which may be used in this invention are acrolein, methylacrolein, crotonaldehyde, cinnamaldehyde, and undecenaldehyde.

The presently useful benzenoid aldehydes may be aliphaticaromatic or purely aromatic aldehydes which may or may not be further substituted, e.g. m-benzaldehyde, o-, m-, or p-tolualdehyde, phenacetaldehyde, 1- or 2-naphthaldehyde, biphenyl-4-carboxaldehyde, hydrocinnamaldehyde, 2,3-dichlorobenzaldehyde, 3-formylacetanilide, piperonal, 2-, 3-, or 4-butoxybenzaldehyde, p-(ethoxy)benzaldehyde, 3,4-dipropoxybenzaldehyde, 4-(n-butylthio)benzaldehyde, o-, m-, or p-iodobenzaldehyde, 3,4- or 3,5-dibromobenzaldehyde, 5-tert-butyl-m-tolualdehyde, 2-p-cymenecarboxaldehyde, 6-methoxy-2-naphthaldehyde, biphenylcarboxaldehyde, 6-methoxy-3-biphenylcarboxaldehyde, etc.

The presently useful aldehydes may also be a heterocyclic aldehyde such as 2- or 3-furaldehyde, 5-acetamido-2-furaldehyde, 5-bromo- or chloro-2-furaldehyde, 5-methyl-2-furaldehyde, 2- or 3-thiophenecarboxaldehyde, 3,5 -dimethyl - 2 -thiophenecarboxaldehyde, 2,5 - dichloro - 3 - thiophenecarboxaldehyde, 2,5 - diethyl - 3-thiophenecarboxaldehyde, etc.

When polyaldehydes are used it is preferred to limit the number of bromine or chlorine atoms replaced from the antimony halide reactant to avoid steric hindrance problems. For example, the reaction of 2 moles of antimony halide reactant. One mole of a dialdehyde compound and 2 moles of a trivalent phosphorus ester proceeds as follows:

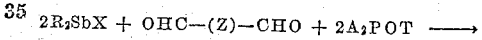

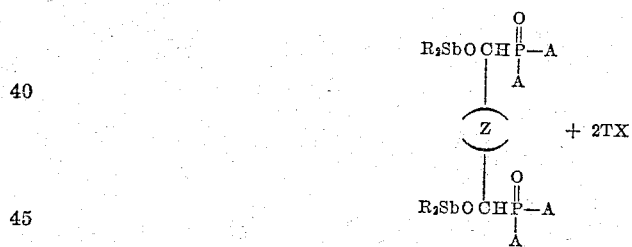

Examples of aliphatic dialdehydes that may be used are saturated dialdehydes such as malonaldehyde, succinaldehyde, isosuccinaldehyde, glutaraldehyde, dimethylmalonaldehyde, ethylmalonaldehyde, methylsuccinaldehyde, adipaldehyde, pimealdehyde, suberaldehyde (octanedialdehyde), isopropylglutaraldehyde, azelaic (nonanedialdehyde), 3 - propyladipaldehyde, sebacaldehyde decanedialdehyde), hendecanedialdehyde, dodecanedialdehyde, brassylaldehyde (tridecanedialdehyde), pentanedialdehyde, hexadecanedialdehyde, octadecanedialdehyde, eicosanedialdehyde. Examples of aliphatic unsaturated dialdehydes that may be used are fumaraldehyde, citraconaldehyde, itaconaldehyde, mesaconaldehyde, cis- and trans-pentenedialdehyde, etc.

Aromatic dialdehyde compounds may also be used, a few examples of which are phthalaldehyde, isophthalaldehyde, terephthalaldehyde, naphthalaldehyde, diphenyl-o,o'-dialdehyde, p-[1-(2-formylethyl)]-benzaldehyde, 2,4-pyrroledialdehyde, p-[1-(5-formylpentyl)] benzaldehyde, etc. Dialdehyde compounds having aliphatic unsaturated groups therein may also be used, e.g., 6[1-(4-formyl-2-butenyl)] 2-naphthaldehyde, etc.

Trivalent phosphorus esters which are generally useful with the aldehyde compounds and antimony halides described above are either simple or mixed phosphites, phosphonites and phosphinities having at least one alkoxy or haloalkoxy radical of from 1 to 12 carbon atoms attached to the phosphorus atom. Examples of useful phosphite compounds are trimethyl, triethyl, triisopropyl, tri-n- propyl, tri-n-butyl, tri-tert-amyl, tri-n-hexyl, tri-n-heptyl, tris(2-ethylhexyl), tri-n-octyl, trinonyl, tridecyl, triundecyl, tri-tert-dodecyl, amyl diethyl, butyl di-n-propyl, n-dodecyl dimethyl, ethyl octyl propyl, tris(2-chloroethyl), tris(3-chloropropyl), tris(2-chloropropyl), tris(3,4-dichlorobutyl), tris(2-bromethyl), tris(2-fluoroethyl), tris(dichlorodecyl), 2-chloroethyl diethyl, 3-bromopropyl bis(2-chloroethyl), diamyl trichlorooctyl, 2-chloroethyl 3-chloropropyl 4-chlorobutyl, 2-chloroethyl methyl propyl, tris(2,3-dichloropropyl), diphenyl methyl, di(-p-tolyl) ethyl and di(α-naphthyl) 2-chloroethyl phosphites. Examples of phosphonite compounds are dimethyl methylphosphonite, dipropyl propylphosphonite, diethyl amylphosphonite, ethyl octyl propylphosphonite, diethyl 2-chloropropylphosphonite, dinonyl dichloromethylphosphonite, 2-chloroethyl butyl propylphosphonite, dibutyl phenylphosphonite and diethyl benzylphosphonite. Examples of phosphinite compounds are methyl dimethylphosphinite, isopropyl diethylphosphinite, n-hexyl n-hexyloctylphosphinite, ethyl diethylphosphinite, ethyl octylpropylphosphinite, propyl methylethylphosphinite, methyl diphenylphosphinite. Mixtures of phosphite, phosphonite and phosphinite esters may also be used.

According to this method of the invention one mole of the aldehyde compound and one mole of the trivalent phosphorus ester are used for each mole of halogen atom that is to be replaced from the antimony halide reactant. For example, when acetaldehyde, antimony trichloride and a trialkyl or tri-haloalkyl phosphite are contacted in 1:1:1 molar proportion of each reactant respectively, the major product obtained is a 1-(dialkoxyphosphinyl)ethyl dichloroantimonite when the trialkyl phosphite is used, and a 1-[bis(haloalkoxy)phosphinyl]ethyl dichloroantimonite when the tris-haloalkyl phosphite is used. When the aldehyde used is formaldehyde, the antimony halide is antimony tribromide, and the trivalent phosphorus ester is dihexyl hexylphosphonite and the three reactants are contacted in 2:1:2 molar proportion, respectively, the resulting product is [bis(hexyloxyhexylphosphinyl)methyl] bromoantimonite. Similarly, when benzaldehyde, antimony trichloride and ethyl dipropylphosphinite are contacted in 3:1:3 molar proportions respectively, the resulting product is tris[α-(dipropylphosphinyl)benzyl] antimonite.

Antimony tribromide and trichloride react with three moles of aldehyde and three moles of trivalent phosphorus ester to give tris(phosphinylhydrocarbyl) antimonites, i.e., compounds of the formula

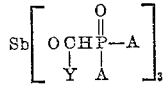

where A and Y are as defined above. A few examples of compounds of this type where the aldehyde is an alkanecarboxaldehyde and the trivalent phosphorus ester is a trialkyl phosphite, a tris(haloalkyl) phosphite, a dialkyl haloalkyl phosphite, or a phosphite having three different alkyl radicals are:

tris[1-(dimethoxyphosphinyl)ethyl] antimonite,
tris[1-(dihexyloxyphosphinyl)undecyl] antimonite,
tris[1-(diundecyloxyphosphinyl)-2-ethylhexyl] antimonite,
tris{1-[bis(2-bromopropoxy)phosphinyl]propyl} antimonite,
tris{1-[bis(11,12-dichlorododecyloxy)phosphinyl] dodecyl} antimonite,
tris[1-(hexyloxyethoxyphosphinyl)butyl] antimonite, and
tris[1-(2-chloropropoxyoctyloxyphosphinyl)2-methylpropyl] antimonite.

Examples of tris(phosphinylhydrocarbyloxy) antimonites obtained when the antimony trihalide is reacted with aldehydes having other functional radicals therein and trivalent phosphonite esters are:

tris[1-(butylbutoxyphosphinyl)-2-chloropropyl] antimonite,
tris[1-(hexylphenoxyphosphinyl)-4-propylthiobutyl] antimonite,
tris[α-(phenyl-2-chloropropoxyphosphinyl)-4-methylbenzyl] antimonite,
tris(1-(octyloctyloxyphosphinyl)-6-carbopropoxyhexyl] antimonite,
tris[α-ethyl-2-phenylethoxyphosphinyl)furfuryl] antimonite,
tris{α-[2,4-dichlorophenyl-2,4-dichlorophenoxyphosphinyl]thenyl} antimonite,
tris[1-(phenylpropoxyphosphinyl)-3-butenyl] antimonite,
tris[1-(butenylbutenyloxyphosphinyl)-6-octynyl] antimonite,
tris[1-(4-chloro-3-cyclohexylhexyloxyphosphinyl) naphthyl] antimonite, and
tris[1-(ethylethoxyphosphinyl)hexyl] antimonite.

Examples of compounds resulting from the reaction of antimony trichloride or tribromide, an aldehyde, and a phosphinite ester where all three of the halogen atoms attached to the antimony are replaced are:

tris[1-(diheptylphosphinyl)ethyl] antimonite,
tris{α-[bis(2-methoxypropyl)phosphinyl]benzyl}antimonite,
tris[1-(hexylphenylphosphinyl)dodecyl] antimonite,
tris[α-(propylethylphosphinyl)furfuryl] antimonite, and
tris[1-(di-p-tolylphosphinyl)pentyl] antimonite.

The same principal applies when other aldehydes and trivalent phosphorus esters are reacted with other antimony halide compounds. For example, when one mole of an antimony halide reactant such as 4-chlorohexyloxydichloroantimonite is reacted with one mole each of butyraldehyde and tris(2-chloropropyl) phosphite the reaction product obtained is 1-[bis(2-chloropropoxy)phosphinyl]butyl 4-chlorohexyl chloroantimonite.

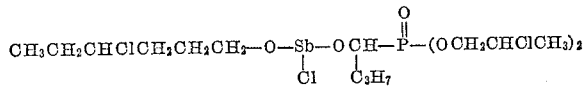

Examples of other compounds produced by replacing one or two halogen atoms from antimony halide reactants having one or two of the antimony valences satisfied by hydrocarbyl-, hydrocarbyloxy-, hydrocarbylthio-radicals or those radicals having halogens therein are:

{1-[bis(2-methylhexyl)phosphinyl]decyloxy}ethylchlorostibine,
bis{1-[(2-chloropropoxy)phenoxyphosphinyl]hexyl}2-chlorobutylantimonite,
1-(phenoxyphenylphosphinyl)naphthyl 2-chloroethyl chloroantimonite,
octylthiobis{1-[bis(4-bromobutoxy)phosphinyl]heptyl} antimonite,
1-(diethoxyphosphinyl)octadecenyl 4-chlorodecyl chloroantimonite,
bis{α-[bis(2-propenyloxy)phosphinyl]benzyl}2-chloropropylantimonite,
{α-[bis(2-hexynyloxy)phosphinyl]thenyl}6-bromodecyl bromoantimonite,
2-chloropropylthiobis{α-[bis(2-chloropropoxy)phosphinyl]furfuryl}antimonite,
[1-(diphenylphosphinyl)propoxy]methylchlorostibine.

Examples of reaction products of dichloro- and dibromostibines, aldehydes, and phosphite, phosphonite, and phosphinite esters which have been benzenoid radicals attached to the phosphorus atoms are:

bis[1-(ethoxyphenylphosphinyl)propyl] ethyl antimonite,
bis{1-[bis(2-phenylethoxy)phosphinyl]ethyl}4-bromobutyl antimonite, bis[1-(p-tolyloxy-p-tolylphosphinyl)heptyl] amyl antimonite,
bis[bis(2-chloro - α - naphthyl)phosphinyl]methyl phenyl antimonite, and
bis[α-(diphenylphosphinyl)-benzyl] 2-chlorophenyl antimonite, obtained by treating dibromo- or dichlorostibine compounds with an aldehyde and a trivalent phosphorus ester in the molar proportion of 1:2:2, respectively, said products having the formula,

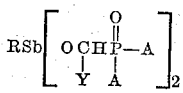

where A, R, and Y are as defined above, are prepared. Similarly, by treating dibromo- or dichlorostibines with aldehydic compounds and trivalent phosphorus esters in the molar proportion of 1:1:1, respectively, products of the formula,

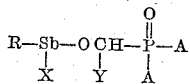

where A, R, X and Y are as above defined, are prepared. Examples of such compounds are:

[1(dipentoxyphosphinyl)hexyl] hexyl bromoantimonite,
phenylthio 1 - [bis(2 - chloropropoxy)phosphinyl]propyl chloroantimonite,
[α - (hexylphenoxyphosphinyl)benzyl] 2 - chlorophenyl chloroantimonite,
[1 - (nonyloxynonylphosphinyl)hexyl] ethylbromostibonite,
{[bis(2 - tolyloxy)phosphinyl]methoxy}2,3 - dichloropropylchlorostibine,
1-[bis(4-chlorophenyl)phosphinyl]-4-hexenyl allyl bromoantimonite.

Examples of the reaction products obtained when monochloro- or monobromostibine compounds having the remaining antimony valences satisfied by R groups, is reacted with an aldehyde, and an alkyl or haloalkyl trivalent phosphorus ester are:

1-(diethoxyphosphinyl)ethyldimethylstibine,
α(dipropoxyphosphinyl)benzyl chloromethyl methyl antimonite,
1-[bis(2 - bromohexyloxy)phosphinyl]butyl 2 - naphthylethyl antimonite,
1-(dodecyloxydodecylphosphinyl)decyl antimonite, and
bis(ethylthio){[1-(2-bromopropoxy - 2 - chloropropoxy) phosphinyl]-8-butylthiooctyl}antimonite.

Examples of reaction products obtained when monochloro or monobromostibine compounds having each of the remaining valences of the antimony atom satisfied by an R group are reacted with an aldehyde and a phosphite, phosphonite, or phosphinite having one or two aromatic radicals attached to the phosphorus atom are:

1-(methoxyphenoxyphosphinyl)ethyl bis(2-chloropropyl) antimonite,
bis(undecylthio) - {1-[bis(4 - chlorophenyl)phosphinyl] tridecyl}antimonite,
1-(2,4-xylyloxy2,4 - xylylphosphinyl)nonyl diphenyl antimonite,
α-[(4-bromophenoxy - 4 - bromophenylphosphinyl)]furfuryl propylphenyl antimonite and,
{1-(methoxyphenoxyphosphinyl) - 2-propenyloxy}stibine.

Aldehyde compounds having various functional substituents may be used in the reaction with the antimony halide and trivalent phosphorus esters to prepare compounds within the scope of this invention. For example, when the trivalent phosphorus ester used is triethyl phosphite and the antimony halide used is bis(2-chloropropyl) chloroantimonite, there are obtained with the substituted aliphatic aldehydes shown below, 1 - (diethoxyphosphinyl)D bis(2-chloropropyl) antimonite where D represents the substituted hydrocarbyl radical derived from the given aldehyde:

| Aldehyde: | D |
| --- | --- |
| 2,3-dichloropropionaldehyde | 2,3-dichloropropyl. |
| 4-cyanobutyraldehyde | 4-cyanobutyl. |
| 3-ethylthiopropionaldehyde | 3-ethylthiopropyl. |
| 8-methoxyoctanal | 8-methoxyoctyl. |
| 10-fluorodecanal | 10-fluorodecyl. |
| phenoxyactaldehyde | 2-phenoxyethyl. |
| 2-chlorobenzaldehyde | 2-chlorobenzyl. |
| 2-hexenal | 2-hexenyl. |
| p-cyanobenzaldehyde | p-cyanobenzyl. |
| m-(methylthio)benzaldehyde | m-(methylthio)benzyl. |
| 2-ethylhexaldehyde | 2-ethylhexyl. |
| o-methylbenzaldehyde | o-methylbenzyl. |
| 3-propylfurfural | 3-propyl-α-furfuryl. |
| 5-methoxy-2-thiophenecarboxaldehyde | 5-methoxythenyl. |
| 4-carboethoxybutyraldehyde | 4-carboethoxybutyl. |

Example of products obtained when a monobromo- or monochloro antimony compound and a trivalent phosphorus ester are reacted with a dialdehyde are:

α,α'-Bis(diethoxyphosphinyl) - p - xylylenyl α,α'bis(dimethylstibinite),
α,α'-Bis[bis(2-chloropropoxy)phosphinyl] - p - xylylenyl α,α'bis(dihexylstibinite),
1,8-bis(phenylphenoxyphosphinyl)octylneyl 1,8 - bis(dimethylantimonite),
1,12-bis(diethylphosphinyl)dodecylenyl 1,12 - bis(ethylmethylstibonite),
1,4-bis[bis(2-ethylhexyloxy)phosphinyl]butenyl 1,4 - bis (4-ethylstibiolane), and
1,20-bis(phenyloxyethylphosphinyl)eicosylenyl 1,20 - bis (diethylstibinite).

The presence of such substituents as the alkoxy, halogen, carboalkoxy, alkylthio, and alkyl radicals in the aldehyde reactant does not affect the course of the reaction. Thus, when instead of an aliphatic aldehyde there is employed, e.g., an alkoxy substituted aldehyde such as 3-butoxybutyraldehyde, the reaction product with triethyl phosphite and bis(2-chloroethyl) chloroantimonite is 1- (diethoxyphosphinyl)-3-butoxybutyl bis(2 - chloroethyl) antimonite. Similarly, when the aldehyde used is 2-chloro-1-naphthaldehyde, the product obtained with ethyl diphenylphosphinite and bis(propylthio)bromostibine is 1-(diphenylphosphinyl)-2-chloro - 1 - napthylmethyl bis (propylthio) antimonite.

Reaction of an antimony compound having at least one halogen attached to the antimony atom, an aldehyde and a trivalent phosphorus ester having at least one alkoxy or haloalkoxy group takes place by mixing together the three reactants in the above indicated proportions at ordinary, decreased, or increased temperature and allowing the resulting reaction mixture to stand until formation of the phosphinylhydrocarbyloxy antimony compound is complete. Because the reaction may be exothermic, gradual contact of the reactants is usually recommended in order to obtain smooth reaction. However, as will be apparent to those skilled in the art, the exothermal nature of the reaction becomes less of a factor as the molecular weight of the reactants, and particularly of the phosphorus ester, is increased. Also, when the aldehyde is either a higher alkanecarboxaldehyde or an aralkyl or alkaryl aldehyde, reaction is generally not as rapid as it is with lower aliphatic aldehydes or with benzaldehyde. It is thus recommended that with each initial run the three reactants be mixed gradually at low temperature and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction in any event, can be readily ascertained by noting cessation in change of viscosity, refractive index, or by the quantity of by-product alkyl or haloalkyl halide produced. Using the lower alkanecarboxaldehydes, which aldehydes are generally very reactive, external cooling is usually advantageous. When working with such aldehydes, optimum conditions comprise gradual addition of a mixture of the aldehyde and trivalent phosphorus ester to the antimony halogen compound with application of external cooling and thorough stirring. Usually it suffices to maintain the reaction temperature at say, from −80° to 50° C. during addition of the aldehyde and phosphorus ester. When all of the mixture has been added to the antimony halide, and there is no longer any evidence of exothermic reaction, completion of the reaction may be assured by heating the reaction mixture to a temperature of from, say 50° C. to 150° C. With the more sluggish aldehydes, e.g., 2-phenylacetaldehyde or lauraldehyde, it may be necessary to heat the reaction mixture moderately, say, to a temperature of 50° C., before an exothermic reaction is started.

When it is desired to replace only part of the halogen atoms linked to the antimony atom it is preferred to mix the proper proportion of reactants at low temperatures, say, at −80° to 0° C. and allow the temperature to rise until the reaction is completed.

The reactants are advantageously employed in stoichiometric proportions, i.e., one mole of aldehydic compound and one mole of the trivalent phosphorus ester per halogen atom. Thus, with an antimony trihalide such as antimony trichloride there are advantageously used three moles each of the aldehyde compound and the trivalent phosphorus ester compound if complete replacement of halogen is desired. However, if it is desired to replace only two, or one of the halogen atoms linked to the antimony atom in the antimony trihalide, then only two, or one moles, respectively, of each of the aldehyde compound and trivalent phosphorus ester are used per mole of antimony trihalide. With an antimony dihalide, e.g. an alkyl dichlorostibine, there are used two moles each of aldehyde compound and trivalent phosphorus ester if complete replacement of halogen in the alkyl dichlorostibine is desired, whereas, if it is desired to replace only, say, one such halogen atom, then only one mole each of aldehyde compound and trivalent phosphorus ester are used. The same principle of proportioning of the reactants applies when working with monohalostibines. Said stoichiometric proportions are advantageously employed in that thereby good yields of desired product result and there arises substantially no problem of separating any excess reactant or reactants. However, where it is not important to control the number of halogen atoms replaced from the antimony atom, excess amounts of the aldehyde compound or phosphorus ester may be employed. In such cases the excess reactants would have to be removed if a pure product were desired.

In conducting this method of preparing the compounds of this invention the antimony halide reactant may be added to a mixture of the aldehyde compound and the trivalent phosphorus ester, the mixture of aldehyde and phosphorus ester may be added to the antimony halide reactant, the aldehyde and phosphorus ester may be added simultaneously to the antimony halide reactant, or the aldehyde may be added to the antimony halide reactant first and then the trivalent phosphorus ester may be added.

Formation of the desired product, i.e., a phosphinylhydrocarbyloxy antimony compound, is accompanied by the formation of a halogenated alkane as a by-product.

(CH₃)₂SbCl + CH₃CHO + P(OC₂H₅)₃ ⟶

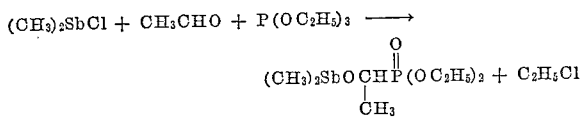

The by-product halogenated alkanes are generally articles of commerce for which many applications exit. Thus, while many currently employed processes for the manufacture of organic compounds of antimony entail substantial waste of halogen in that by-products of little commercial importance are formed, in the present instance all of the halogen constituent of the raw materials is converted to products of economic importance.

The process of the present invention is readily conducted in the absence of an inert diluent or catalyst. However, catalysts and diluents or solvents may be employed. The use of diluents may be particularly advantageous when working with the highly active aldehydes; such diluents may be, e.g., benzene, toluene, dioxane, methylene chloride, methylene bromide or hexane. When employing no diluent and using substantially the stoichiometric proportion of reactants, the reaction product which consists essentially of the phosphinylhydrocarbyloxy antimony compound dissolved in the halogenated alkane which is produced as a by-product in the reaction may be used directly for a variety of industrial and agricultural purposes without purification.

An alternative method for the preparation of the present compounds comprises reaction of an antimony halide, described above, with an ester of an α-hydroxyphosphonic or phosphinic acid, or with an α-hydroxy phosphine oxide in the presence of a basic material to remove the hydrogen halide by-product. Thus, reaction of, say, a dialkylchlorostibine with such a phosphorus compound in the presence of pyridine proceeds as follows:

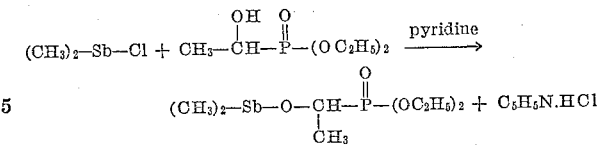

Reaction with an antimony trihalide or dihalide results in a similar replacement of, three, or two halogen atoms, respectively, if stoichiometric amounts of the α-hydroxyphosphorus compound are used. The antimony halide compound may be antimony tribromide or trichloride, or a compound of the formula RSbX₂ or R₂SbX where X is bromine or chlorine and R is as defined above. The α-hydroxyphosphorus reactant may be any compound of the general formula

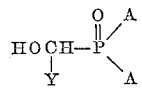

wherein Y and A are as defined above.

The compounds of this invention which have halogen atoms attached to the antimony atom can be reacted with various chemicals to replace or relocate the halogen atoms so attached. Thus, such compounds may be reacted with alcohols, or thiols to replace the halogen atoms with hydrocarbyloxy, or hydrocarbylthio radicals. Particularly useful chemicals for reaction with the halogen compounds are epoxides discussed above. Thus, antimony tri- and dihalides may be treated with epoxide either prior to or subsequent to the formation of the phosphinylhydrocarbyloxy antimony compounds to displace any halogens remaining attached to the antimony atom. For example, [1-(dipropoxyphosphinyl)ethoxy]-methylchlorostibine reacts with, say, 1,2-epoxybutane according to the following scheme,

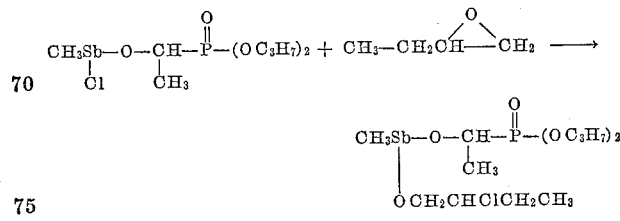

to give [1-(dipropoxyphosphinyl)ethoxy] - 2 - chlorobutoxymethylstibine.

The compounds provided by this invention are stable, usually high boiling materials which range from viscid liquids to waxy or crystalline solids. They are useful as biological toxicants, e.g., insecticides, fungicides, nematocides, bacteriostats; as lubricants and gasoline additives; as functional fluids, e.g., in force transmission media and dielectric applications; as plasticizers for synthetic resins and plastics, and as rubber compounding chemicals. They are also useful as antioxidants and as pharmaceuticals. The compounds of this invention, especially those which also contain bromine and/or chlorine, are particularly useful as fire-retardant or flameproofing chemicals. They are especially valuable in organic compositions. They are valuable for this purpose as additives to polyurethane and polystyrene foams, to other synthetic fabric compositions, as well as cellulosic and carbonaceous combustible materials, e.g. surface coatings, lacquers, polymers, resins, adhesives, and sealing compositions. These compounds thus provide a method of incorporating the three best known fire-retarding elements, namely, antimony, phosphorus, and bromine, in one compound with the additional advantage that these compounds are soluble in organic materials. For example, 1-[bis(2-bromopropoxy)phosphinyl]ethyl bis(2-bromopropyl) antimonite, a compound within the scope of this invention, has over 60% of its molecular weight in the form of the desired fire-retardant elements.

*Example 1*

Antimony trichloride, 44.5 g. (0.195 mole), was distilled directly into a reaction flask and dissolved in benzene. The resulting solution was cooled to 10° C. and treated with 11.3 g. (0.195 mole) of propionaldehyde added at a dropwise rate. After the aldehyde had been added, 65.3 g. (0.195 mole) of trihexyl phosphite was added while keeping the temperature between 20° C. and 28° C. with cooling. The reaction mixture was heated to 80° C. to insure complete reaction, and cooled to 25° C. The remaining chlorine atoms attached to antimony were replaced by treating the 1-(dihexyloxyphosphinyl)-propyl dichloroantimonite with 27.1 g. (0.467 mole) of propylene oxide at 28° to 33° C. The mixture was heated to 80° C. to insure complete reaction and to remove the benzene solvent and low boiling by-products under vacuum of 0.08 mm. There was thus obtained 119.8 g. (99.8% of theory) of 1-(dihexyloxyphosphinyl)propyl bis(2-chloropropyl) antimonite.

$$(CH_3CHClCH_2O)_2SbOCH-P(=O)(OC_6H_{13})_2$$
$$|$$
$$C_2H_5$$

|  | Found | Anal. Calcd. for $C_{21}H_{44}Cl_2O_6PSb$ |
|---|---|---|
| Percent: | | |
| C | 41.03 | 41.00 |
| H | 7.27 | 7.20 |
| Cl | 11.69 | 11.52 |
| P | 4.98 | 5.20 |
| Sb | 19.59 | 19.75 |

*Example 2*

A mixture of 25.0 g. (0.192 mole) of ethyl 3-formylpropionate and 31.9 g. (0.192 mole) of triethyl phosphite was added dropwise to a methylene chloride solution of 43.9 g. of antimony trichloride at 10°–15° C. Upon completion of the addition, the temperature of the reaction mixture was raised to 40° C. to insure complete reaction. At this stage the main product was 1-(diethoxyphosphinyl) - 3 - carboethoxypropyl dichloroantimonite. Propylene oxide, 26.9 g. (0.462 mole), was added dropwise at 25°–35° C. and then the reaction mixture was refluxed for 1 hour. The methylene chloride and excess propylene oxide were removed by concentration of the reaction mixture to 105° C./0.05 mm. There was thus obtained 106.4 g. (96.4% of theory) of substantially pure 1 - (diethoxyphosphinyl) - 3 - carboethoxypropyl bis(2-chloropropyl) antimonite.

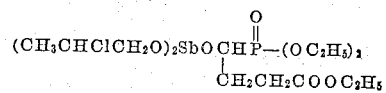

|  | Found | Anal. Calcd. for $C_{16}H_{32}Cl_2O_8PSb$ |
|---|---|---|
| Percent: | | |
| C | 33.19 | 33.40 |
| H | 5.41 | 5.60 |
| Cl | 12.48 | 12.31 |
| P | 5.31 | 5.38 |
| Sb | 21.41 | 21.15 |

*Example 3*

Antimony trichloride was distilled directly into a reaction flask until a total of 40.2 g. (0.176 mole) had been added. Methylene chloride (100 ml.) was added and the mixture stirred until solution of the antimony trichloride was complete. Addition of a mixture of 21.9 g. (0.176 mole) 6-methyl-3-cyclohexenecarboxaldehyde and 29.3 g. (0.176 mole) of triethyl phosphite was made at 10° C. to 21° C. The mixture was refluxed for 15 minutes and then cooled to 25° C. At this stage the reaction product was essentially a mixture of (diethoxyphosphinyl)-6-methyl - 3 - cyclohexenylmethyl dichloroantimonite. To this reaction product 24.5 g. (0.422 mole) of propylene oxide was added dropwise at 25–35° C. Upon completion of the addition, the reaction mixture was heated at reflux for one hour. Concentration of the reaction mixture to 105° C./0.05 mm. gave substantially pure (diethoxyphosphinyl)-6-methyl-3-cyclohexenylmethyl bis(2-chloropropyl) antimonite.

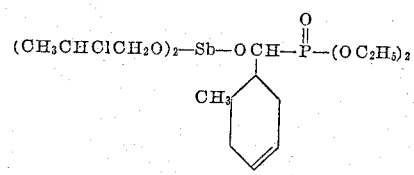

|  | Found | Anal. Calcd. for $C_{18}H_{34}Cl_2O_6P_2Sb$ |
|---|---|---|
| Percent: | | |
| C | 37.89 | 38.05 |
| H | 5.89 | 6.02 |
| Cl | 12.57 | 12.42 |
| P | 5.47 | 5.43 |
| Sb | 21.40 | 21.35 |

*Example 4*

Antimony trichloride (73.4 g.) was dissolved in 150 ml. of methylene chloride and the resulting solution was cooled to −20° C. A mixture of 21.6 g. of propionaldehyde and 55.0 g. of triethyl phosphite was added slowly while maintaining the temperature between −15° and −20° C. The clear solution was essentially 1-(diethoxyphosphinyl)propyl dichloroantimonite. To this reaction mixture there was added dropwise 44.7 g. of propylene oxide at 25° to 42° C. The mixture was refluxed for 1 hour and then placed under vacuum and heated to 85° C./0.05 mm. to remove the methylene chloride and excess propylene oxide. There was thus obtained as product 154 g. of gray liquid 1-(diethoxyphosphinyl)-propyl bis(2-chloropropyl) antimonite.

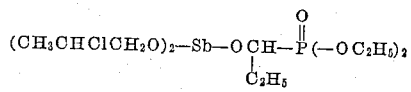

|   | Found | Anal. Calcd. for $C_{13}H_{29}Cl_2O_6PSb$ |
|---|---|---|
| Percent: | | |
| C | 30.89 | 31.00 |
| H | 5.44 | 5.60 |
| Cl | 14.33 | 14.05 |
| P | 6.27 | 6.15 |
| Sb | 23.67 | 24.10 |

*Example 5*

To a solution of 57.8 g. (0.257 mole) of antimony trichloride dissolved in 115 ml. of methylene chloride and cooled to −20° C. there was added 35.0 g. (0.257 mole) of p-anisaldehyde. Then 42.7 g. (0.257 mole) of triethyl phosphite was added. The exothermic reaction was controlled by keeping the temperature of the mixture between −5° C. and −10° C. Upon completion of the phosphite addition, the mixture was heated at reflux for 15 minutes to insure complete reaction. The two remaining chlorine atoms attached to the antimony were replaced by adding 36.0 g. (0.620 mole) of propylene oxide to the reaction mixture at 25 to 34° C., and then refluxing the mixture for 1 hour to complete the reaction. Methylene chloride and excess propylene oxide were removed in the manner described in the previous examples. There was recovered 145.5 g. (97.5% of theory) of α-(diethoxyphosphinyl)-p-methoxybenzyl bis-(2-chloropropyl) antimonite.

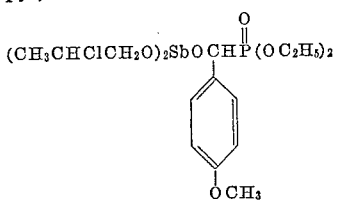

|   | Found | Anal. Calcd. for $C_{15}H_{30}Cl_2O_4PSb$ |
|---|---|---|
| Percent: | | |
| C | 37.25 | 37.21 |
| H | 5.24 | 5.22 |
| Cl | 12.21 | 12.20 |
| P | 5.21 | 5.33 |
| Sb | 20.91 | 20.95 |

*Example 6*

Propylene oxide, 14.5 g. (0.25 mole), was added dropwise to a cooled solution of 57.1 g. (0.25 mole) of antimony trichloride, 100 ml. of methylene chloride, and 0.6 g. of ethylene chlorohydrin. Upon completion of the addition of the propylene oxide, the temperature was allowed to warm to room temperature. The resulting propylene oxide/antimony trichloride reaction product was added dropwise to a mixture of 29.0 g. (0.50 mole) of propionaldehyde and 83.1 g. (0.50 mole) of triethyl phosphite which had been cooled to −40° C. The temperature was raised to −25° to −30° C. and held there for 20 minutes to control the reaction and then raised to room temperature. The solution was warmed slowly to 80° C./0.14 mm. to insure complete reaction and to remove methylene chloride. There was obtained as a residue 144.2 g. (95.4% of theory) of a grey liquid, bis-[1 - (diethoxyphosphinyl)propyl]2 - chloropropyl antimonite.

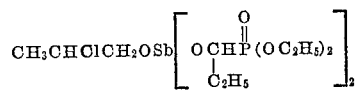

*Example 7*

Antimony trichloride, 69.0 g. (0.3 mole), was mixed with methylene chloride, cooled to 10°, and treated with 34.9 g. (0.6 mole) of propylene oxide which was added dropwise. The resulting exothermic reaction raised the temperature of the mixture to 43° C. This reaction mixture was added dropwise to a mixture of 17.4 g. (0.3 mole) of propionaldehyde and 50 g. (0.3 mole) of triethyl phosphite while cooling to −20° C. Upon completion of the addition, the temperature was allowed to rise and methylene chloride was removed to 60° C. at reduced pressure. There was obtained as residue 142.5 g. of a gray liquid 1-(diethoxyphosphinyl)propyl bis(2-chloropropyl) antimonite.

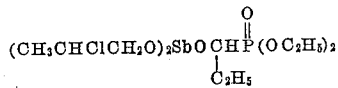

*Example 8*

Antimony trichloride, 42.3 g. (0.185 mole), was dissolved in 100 ml. of methylene chloride and cooled to −20° C. A mixture of 21.5 g. (0.370 mole) of propionaldehyde and 61.5 g. (0.370 mole) of triethyl phosphite was added dropwise to the antimony trichloride solution while the temperature was maintained at −15° to −25° C. After the addition was complete, the temperature was raised until at −5° C., another exothermic reaction occurred. Upon completion of the reaction, the mixture was warmed at 85°–88° C./0.1 mm. for 1 hour to insure complete reaction, and to remove methylene chloride. There was thus obtained bis[1-(diethoxyphosphinyl) ethyl] chloroantimonite.

|   | Found | Anal. Calcd. for $C_{14}H_{32}ClO_8P_2Sb$ |
|---|---|---|
| Percent: | | |
| P | 11.01 | 11.32 |
| Sb | 22.92 | 22.30 |

*Example 9*

To 45.3 g. (0.198 mole) of antimony trichloride dissolved in 100 ml. of methylene chloride and cooled to −20° C. there was added dropwise a mixture of 11.5 g. (0.198 mole) of propionaldehyde and 61.7 g. (0.198 mole) of tris(2-chloropropyl) phosphite while holding the temperature between −15° and −20° C. Upon completion of the addition of the aldehyde/phosphite mixture, the temperature was allowed to rise to room temperature. The mixture was heated to 40° C., cooled to 25° C. and then 27.6 g. (0.475 mole) of propylene oxide was added dropwise at 30° to 33° C. The resulting solution was refluxed for 1 hour, the methylene chloride and excess propylene oxide were removed, and the solution was heated at 80° C./0.1 mm. for 0.5 hour. There was thus obtained 133.4 g. of crude 1-[bis(2-chloropropoxy)phosphinyl]-propyl bis(2-chloropropyl) antimonite having the structure

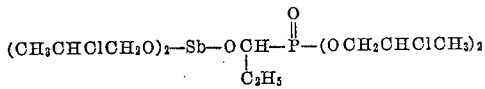

*Example 10*

A mixture consisting of 17.4 g. (0.30 mole) of propionaldehyde and 50 g. (0.30 mole) of triethyl phosphite was added to a solution of 68.5 g. (0.30 mole) of antimony trichloride in 150 ml. of methylene chloride cooled at −15° to −25° C. during the addition. The mixture was gradually warmed to room temperature, heated to 60° C. to insure complete reaction and concentrated to 85°/0.07 mm. to obtain the grey liquid product,

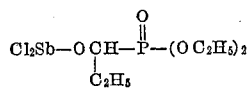

*Example 11*

Freshly distilled antimony trichloride, 153.0 g. (0.67 mole), was dissolved in 300 ml of methylene chloride in a reaction flask and the solution was cooled to −20° C. A mixture of 59.0 g. (1.34 moles) of acetaldehyde and 417.0 g. (1.34 moles) of tris(2-chloropropyl) phosphite was added dropwise at −15° to −20° C. with stirring. Upon completion of the addition the temperature was raised to 50° C. to insure complete reaction. The reaction product at this stage was primarily bis{1-[bis(2-chloropropoxy)phosphinyl]ethoxy} chloroantimonite. It was cooled to 30° C. and treated with 46.5 g. (0.80 mole) of propylene oxide. After the reaction was complete, the solution was heated to reflux for 1 hour and then concentrated to 81°/0.5 mm. There was thus obtained 623 g. of bis{1-[bis(2-chloropropoxy)phosphinyl]ethyl} 2-chloropropyl antimonite.

*Example 12*

Antimony trichloride, 45.6 g. (0.2 mole), dissolved in methylene chloride was treated with a mixture of 100 g. (0.6 mole) of triethyl phosphite and 35 g. (0.6 mole) of propionaldehyde at −20° to −30° C. and then the temperature was allowed to slowly increase to room temperature. The mixture was heated to 75° C. to insure complete reaction and then to 88° C./0.2 mm. to remove methylene chloride. There was thus obtained as a grey liquid tris[1-(diethoxyphosphinyl)-propyl] antimonite having the structure

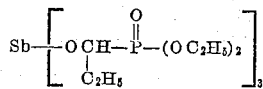

*Example 13*

To 55.0 g. (0.241 mole) of antimony trichloride dissolved in methylene chloride 33.8 g. (0.241 mole) of o-chlorobenzaldehyde was added dropwise at −10 to 15° C., and then 40.0 g. (0.241 mole) of triethyl phosphite was added at 15° C. After the exothermic reaction had subsided, the mixture was heated to reflux (42° C.) of 15 minutes to insure complete reaction. The product at this stage was α-(diethoxyphosphinyl)-2-chlorobenzyl dichloroantimonite in admixture with the solvent and by-product ethyl chloride. Propylene oxide, 33.6 g. (0.578 mole), was added to replace the two chlorine atoms attached to the antimony. After heating the mixture under vacuum to 100° C./0.08 mm. to remove methylene chloride and excess propylene oxide, there was obtained 135.0 g. of substantially pure α-(diethoxyphosphinyl)-2-chlorobenzyl bis(2-chloropropyl) antimonite.

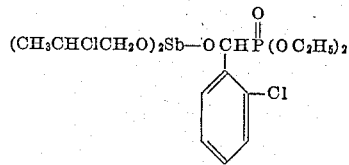

*Example 14*

Using methylene chloride as a reaction medium, 55.3 g. (0.242 mole) of antimony trichloride, 31.0 g. (0.242 mole) of 2-ethylhexaldehyde, and 40.3 g. (0.242 mole) of triethyl phosphite were reacted at 5°–15° C. Upon completion of the exothermic reaction, the mixture was refluxed as in the previous examples to insure complete reaction. Upon cooling to room temperature 33.7 g. (0.579 mole) of propylene oxide was added at 25°–35° C. The mixture was refluxed, and the solvent and excess propylene oxide were removed as in the prior examples. There was thus obtained 131 g. of 1-(diethoxyphosphinyl)-2-ethylhexyl bis(2-chloropropyl) antimonite.

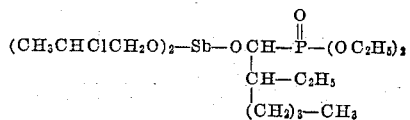

*Example 15*

To 72.5 g. (0.317 mole) of antimony trichloride dissolved in methylene chloride and cooled to 5° C. there was added dropwise 30.5 g. (0.317 mole) of furfural and then 52.7 g. (0.317 mole) of triethyl phosphite while controlling the temperature between 5° to 15° C. On completion of the addition of all the phosphite, the mixture was warmed to 25° C., treated with 44.2 g. (0.76 mole) of propylene oxide at 25° to 33° C. and heated to reflux (43° C.) for one hour to insure complete reaction. Thereafter the methylene chloride and excess propylene oxide were removed, leaving as a residue 169.3 g. (98% of theory) of substantially pure α-(diethoxyphosphinyl)-furfuryl bis(2-chloropropyl) antimonite.

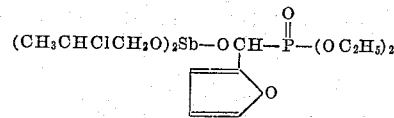

*Example 16*

Antimony trichloride 72.0 g. (0.315 mole), in methylenechloride solvent was treated with 37.9 g. (0.315 mole) of p-tolualdehyde and 52.4 g. (0.315 mole) of triethyl phosphite while cooling to control the exothermic reaction as in the previous examples. After refluxing the mixture for 15 minutes, it was treated with 43.9 g. (0.757 mole) of propylene oxide at 28°–33° C. The solvent and excess propylene oxide were removed as in the prior examples. The product, 177.5 g. (99.7% of theory), was essentially pure α-diethoxyphosphinyl)-4-methylbenzyl bis(2-chloropropyl) antimonite.

| | Found | Anal. Calcd. for $C_{18}H_{30}Cl_2O_6PSb$ |
|---|---|---|
| Percent: | | |
| C | 37.92 | 38.20 |
| H | 5.40 | 5.35 |
| Cl | 12.27 | 12.53 |
| P | 5.20 | 5.48 |
| Sb | 21.59 | 21.50 |

*Example 17*

Acrolein (15.9 g., 0.28 mole) and then triethyl phosphite (46.9 g., 0.28 mole) were added to a solution of 64.4 g. (0.28 mole) of antimony trichloride in 130 ml. of methylene chloride at 5° C. to 15° C. When the exothermic reaction had ceased the mixture was heated at reflux for 5 minutes. Then 39.4 g. (0.679 mole) of propylene oxide was added dropwise while stirring at 28° to 33° C. The mixture was refluxed for one hour to insure complete reaction, and heated under vacuum up to 95° C./0.08 mm. to remove solvent and excess propylene oxide. There was thus obtained 141.1 g. (99.8% of theory) of 1-(diethoxyphosphinyl)-2-propenyl bis(2-chloropropyl) antimonite.

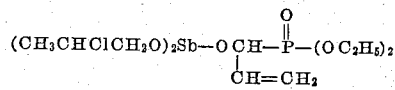

*Example 18*

To 72.7 g. (0.318 mole) of antimony trichloride dissolved in 145 ml. of methylene chloride and cooled to 5° C., 18.5 g. (0.318 mole) of propionaldehyde was added dropwise while cooling to keep the temperature between 5° and 10° C. Diethyl phenylphosphonite (63.2 g., 0.318 mole) was added at 10° to 15° C. The solution was heated to reflux to obtain 1-(ethoxyphenylphosphinyl)-propyl dichloroantimonite as a dark gray liquid which was treated with 44.4 g. (0.765 mole) of propylene oxide at 28 to 33° C. and then warmed to 95° C./0.15 mm. to remove methylene chloride and excess propylene oxide.

There was obtained as product 171.2 g. of 1-(ethoxyphenylphosphinyl)propyl bis(2-chloropropyl) antimonite.

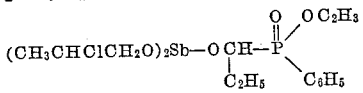

Phosphinite esters such as ethyl diethylphosphinite, propyl diethylphosphinite, hexyl dipropylphosphinite, butyl diphenylphosphinite, octyl phenyl(propyl)phosphinite, etc., react in a similar manner to produce antimony and phosphorus containing compounds.

*Example 19*

Antimony trichloride (22.8 g. or 0.1 mole) was added to a mixture consisting of 55.0 g. (0.33 mole) of triethyl phosphite and 23.2 g. (0.4 mole) of propionaldehyde which had been cooled to −20° C. The temperature was allowed to rise to −15° C. during the addition of the antimony trichloride and was then gradually raised to room temperature to control the resulting exothermic reaction. The reaction mixture was warmed to 110° C. and then subjected to a pump vacuum for 1.5 hours. There was thus obtained 74.7 g. of a grey liquid, tris-[1-(diethoxyphosphinyl)propyl] antimonite.

|  | Found | Anal. Calcd. for $C_{21}H_{48}O_{12}P_3Sb$ |
|---|---|---|
| Percent: |  |  |
| C | 35.49 | 35.70 |
| H | 6.79 | 6.83 |
| Cl | 0.00 | 0.00 |

*Example 20*

A benzene solution of antimony trichloride (obtained by warming 62.9 g. or 0.275 mole of antimony trichloride in 160 ml. of benzene) was cooled to 20° C. and treated with 29.2 g. (0.275 mole) of benzaldehyde at 18° to 22° C. The solution was warmed to 35° C. and treated with 85.8 g. (0.275 mole) of tris-(2-chloropropyl) phosphite at 34° to 38° C. The mixture was heated to 78° C. to insure complete reaction and then cooled to 30° C. to obtain α-[bis(2-chloropropoxy)phosphinyl]benzyl dichloroantimonite in solution. This reaction mixture was treated with 38.4 g. (0.661 mole) of propylene oxide at 28 to 33° C. and then heated to 70° C. for 20 minutes and then to 80° C. at 0.03 mm. to remove benzene, excess reactants, and by-products. There was thus obtained 188.8 g. of α-[bis(2-chloropropoxy)phosphinyl]benzyl bis(2-chloropropyl) antimonite.

*Example 21*

To 268 g. (0.742 mole) of antimony tribromide dissolved in 800 ml. of benzene there was added rapidly at 25° C., 43.2 g. (0.742 mole) of propionaldehyde. Tris-(2-bromopropyl)phosphite (330 g., 0.742 mole) was added while keeping the temperature at 30° C. with cooling. When the addition was completed, the mixture was heated to 60°–65° C. for 3 hours to insure complete reaction. The 1-[bis(2-bromopropoxy)phosphinyl] propyl dibromoantimonite in solution was treated with 90.5 g. (1.56 mole) of propylene oxide at 25° C. to 35° C. The mixture was heated to 60° C. for 1 hour to insure complete reaction and then to 85° C./0.01 mm. to remove the low boiling materials. There was thus obtained substantially pure α-[bis(2-bromopropoxy) phosphinyl]propyl bis(2-bromopropyl) antimonite.

|  | Found | Anal. Calcd. for $C_{15}H_{30}Br_4O_6PSb$ |
|---|---|---|
| Percent: |  |  |
| C | 22.73 | 23.15 |
| H | 3.84 | 3.89 |
| P | 3.87 | 3.98 |
| Sb | 15.65 | 15.63 |

The following examples illustrate the alternative method discussed above for making the compounds of this invention.

*Example 22*

Antimony trichloride was distilled into a reaction flask until 33.9 g. (0.148 mole) had been collected, and 300 ml. of methylene chloride was added. Then 82 g. (0.450 mole) of diethyl 1-hydroxyethylphosphonate was added all at once. The solution was cooled to 10° C. and then triethylamine was added at a rate sufficient to keep the temperature below 15° C. The mixture was stirred in an ice bath for 0.5 hour and then heated at reflux for 1 hour to obtain a very thick solution. The methylene chloride solvent was removed under vacuum at 35° C. and replaced with ethyl ether. The solution was filtered to remove the amine hydrochloride precipitate and concentrated to 95° C./1.0 mm. to obtain 58.5 g. of tris[1-(diethoxyphosphinyl)ethyl] antimonite.

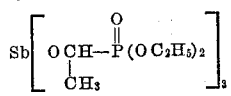

*Example 23*

To 40.5 g. (0.177 mole) of antimony trichloride dissolved in methylene chloride 20.6 g. (0.355 mole) of propylene oxide was added dropwise at 30° to 35° C. with cooling. After stirring the reaction mixture for 0.5 hour to insure complete reaction, 34.8 g. (0.177 mole) of diethyl 1-hydroxypropylphosphonate was added at 20° C., and then 19 g. (0.177 mole) of triethylamine was added dropwise at 20° to 25° C. After refluxing the reaction mixture for 2.5 hours the methylene chloride was removed and replaced with ethyl ether. The triethylamine hydrochloride precipitate was filtered off and then the ether was evaporated. The residual material was heated to 90° C./0.1 mm. to insure complete removal of volatiles. There was thus obtained 56 g. of 1-diethoxyphosphinyl)propyl bis(2-chloropropyl)-antimonite.

*Example 24*

To 36.0 g. (0.157 mole) of antimony trichloride distilled directly into a reaction flask and dissolved in methylene chloride, 92.8 g. (0.472 mole) of diethyl 1-hydroxypropylphosphonate was added all at once, and the solution was cooled to 20° C. Then 50.5 g. (0.499 mole) of triethylamine was added dropwise. After refluxing the resulting reaction mixture for 2 hours, the mixture was cooled to 25° C. and filtered to remove the triethylamine hydrochloride. The remaining filtrate was heated to 70° C. and then to 102° C./0.05 mm. to remove solvent. There was obtained 106.5 g. (96.6% of theory) of tris[1-(diethoxyphosphinyl)propyl] antimonite.

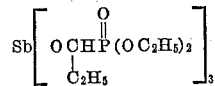

|  | Found | Anal. Calcd. for $C_{21}H_{48}O_{12}P_3Sb$ |
|---|---|---|
| Percent: |  |  |
| C | 34.83 | 35.75 |
| H | 6.87 | 6.85 |
| P | 12.45 | 13.13 |
| Sb | 16.91 | 17.20 |

*Example 25*

To a mixture consisting of 74 g. (1.68 moles) of acetaldehyde and 570 g. (1.65 moles) of tris(2-chloropropyl) phosphite, cooled at −20° C., there was added portionwise 188 g. (0.825 mole) of antimony trichloride while allowing the temperature to rise gradually. Two exothermic reactions occurred, one at about −5° C. and the other at about 17° C. At each such occurrence cooling was applied until the reaction was completed. The mixture was warmed to 90° C. and finally concentrated to 88° C./0.18 mm. to remove by-products. Analyses of the residue in the reaction vessel showed that it was bis{1-[bis(2-chloropropoxy)phosphinyl]ethyl}chloroantimonite.

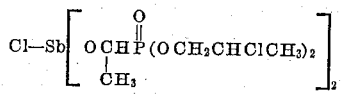

*Example 26*

Diethyl chloroantimonite (44.5 g., 0.180 mole) was dissolved in 200 ml. of methylene chloride. The solution was cooled to 10° C. and then while stirring, a mixture of 11.3 g. (0.195 mole) of propionaldehyde and 32.4 g. (0.195 mole) of triethyl phosphite was added dropwise. Upon completing addition of the aldehyde/phosphite mixture, the reaction mixture was heated to reflux for one hour, left to stand overnight, and heated again finally to 83° C./0.20 mm. to insure complete reaction and to remove the methylene chloride. There was thus obtained 61.0 g. of [1-(diethoxyphosphinyl)propyl] diethyl antimonite.

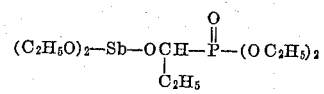

*Example 27*

To 75.0 g. (0.278 mole) of diethyl chlorothioantimonite dissolved in 200 ml. of methylene chloride and cooled to 10° C., there was added dropwise a mixture of 16.0 g. (0.285 mole) of propionaldehyde and 45.7 g. (0.285 mole) of triethyl phosphite. The resulting reaction mixture was refluxed for two and one half hours, finally warmed to 95° C./0.3 mm. to insure complete reaction and to remove the methylene chloride and volatile by-products. There was obtained 114.2 g. of 1-(diethoxyphosphinyl)propyl bis(ethylthio) antimonite.

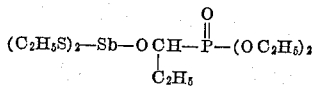

*Example 28*

To 49.5 g. (0.216 mole) of freshly distilled antimony trichloride dissolved in 100 ml. of methylene chloride there was added 14.5 g. (0.108 mole) of terephthalaldehyde. After stirring the resulting mixture for a few minutes, 36.1 g. (0.216 mole) of triethyl phosphite was added dropwise with cooling at 25° C. to 30° C. The mixture was warmed to 50° C. to insure complete reaction and to remove the methylene chloride diluent. The residue, which turned solid upon removal of most of the methylene chloride, was α,α'-bis(diethoxyphosphinyl)-p-xylylenyl α,α'-bis(dichloroantimonite)

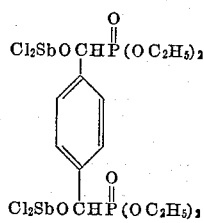

This material was redissolved in 200 ml. of methylene chloride, and 37.8 g. (0.65 mole) of propylene oxide (50% excess of theory) was added dropwise with cooling at 15°–20° C. When the addition was completed, the reaction mixture was refluxed for three hours to insure complete reaction. The excess propylene oxide, methylene chloride and other low boiling materials were removed up to 80° C. at atmospheric pressure and then under vacuum to 95° C./0.02 mm. There was thus obtained 112.7 g. (100% of theory) of α,α'-bis(diethoxyphosphinyl)-p-xylylenyl α,α'-bis[(2-chloropropyl)antimonite]

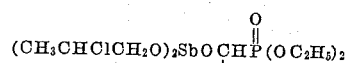

which analyzed as follows:

| | Found | Anal. Calcd. for $C_{28}H_{50}Cl_4O_{12}P_2Sb_2$ |
|---|---|---|
| Percent: | | |
| C | 31.57 | 32.80 |
| H | 4.91 | 4.91 |
| Cl | 11.38 | 13.81 |
| P | 5.81 | 6.04 |

In the polyurethane foam making art it is desirable to formulate a "one-shot" recipe for making the foams from polyesters. Catalysts are usually used to promote the polymerization reaction. To make a fire-retardant polyurethane foam, it is also desirable to incorporate into the "one-shot" mix, a flame-proofing or fire-retarding agent. We have found that compounds of the present invention provide both properties when they are admixed with the polyurethane foam making ingredients. The polyurethanes are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene esters having at least 2 hydroxyl groups, polythioether glycols, polyesteramides, etc. Advantageously the hydroxyl number of the polyhydric compound is not substantially more than about 225 and is seldom less than 56. When a polyester is used, the acid number is less than 10 and usually is as near to 0 as possible. Excess of the diisocyanate over that required to react with all of the active hydrogen atoms of the organic compound is advantageously used:

The polyesters used for the production of the polyurethane may be branched and/or linear. Thus, the useful polyesters and/or polyesteramides may include those obtained by condensing any polybasic (preferably disbasic) carboxylic organic acid, such as adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-(β-hydroxyethyl) ether, etc., and/or amino-alcohols such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc., and with mixtures of the above polyalcohols and amines, ethylene diamine, hexamethylene diamine, 3-methylhexamethylene diamine, decamethylene diamine and m-phenylenediamine, etc. and/or amino-alcohols, etc. In the esterification, the acid per se may be used for condensation or, where desirable, equivalent components, such as the acid halide or anhydride may be used.

The alkylene glycols and polyoxyalkylene or polythioalkylene glycols used for the production of the polyurethanes may comprise ethylene glycol, propylene glycol, butylene glycol-2,3, butylene glycol-1,3, 2-methylpentanediol-2,4, 2-ethylhexanediol-1,3, hexamethylene glycol, styrene glycol and decamethylene glycol, etc., and diethylene glycol, triethylene glycol, tetraethylene glycol, polythioethylene glycol, polyethylene glycols 200, 400 and 600 etc., dipropylene glycol, tripropylene glycol, polypropylene glycols 400, 750, 1,200 and 2,000, etc.

Broadly, any of the prior art polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate, 1,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate or polyisocyanates in a block or inactive form such as the biphenyl carbamates of toluylene diisocyanate, p,p'-diphenylmethane diisocyanate, p-phenylene diisocyanate and 1,5-naphthalene diisocyanate, etc.

In practice, the polyurethane plastics are produced by bringing together the organic compound which contains at least 2 reactive hydrogen atoms and is capable of forming polyurethanes, with the polyisocyanate and an activator mixture. The latter is made up of at least one cross-linking agent and/or accelerator and may contain, if desired, added water or an aqueous solution. The addition of such an activator mixture to the mixture of polyisocyanates and active hydrogen compound initiates the cross-linking action needed to obtain homogeneous plastics or the cross-linking and foaming action necessary to obtain foam plastics. Useful cross-linking agents include water or aqueous solutions for foamed plastics and the polyalcohols, such as ethylene glycol, propylene glycol, butylene glycol, diethylene glycol, triethylene glycol, glycerol, etc., for non-porous plastics, and useful accelerators include the tertiary amines (either individually or in mixture) such as dimethylhexahydroaniline, diethylhexahydroaniline, reaction products of N,N'-diethyl-aminoethanol and phenylisocyanate, esteramines, etc. Also sodium phenolates, added with suitable plasticizers, may be employed in the manufacture of foamed products.

For preparation of the flame-retardant polyurethanes, the present antimony-phosphinylhydrocarbyloxy compounds are preferably added to a prepolymer prepared from the active hydrogen compound and the diisocyanate previous to or simultaneously with the activator mixture, i.e., before hardening. The hardened molded pieces or foams are rendered flame retarded by the inclusion therein of the present antimony-phosphinylhydrocarbyloxy compounds in quantities of, say from 5% to 25% by weight of the polyurethane. Simultaneous plasticizing property is evidenced and continues to be demonstrated until the quantity of antimony-phosphinylhydrocarbyloxy compound is substantially equal to that of the polyurethane. Use of this type of antimony-phosphorus compound in the polyurethane foams also imparts thermal stability and good mechanical properties to the foams. The following tests illustrate these discoveries.

The test procedure was as follows: The catalyst to be tested was added to a polypropylene glycol reactant and thoroughly mixed. The mixture was reacted by adding the theoretical amount of tolylene diisocyanate reactant necessary to react with the polypropylene glycol. Immediately after adding the tolylene diisocyanate reactant, portions of the reaction mixture were placed in test tubes kept at room temperature and 70° C., respectively. The mixtures in the test tubes at room temperature and at 70° C. were examined periodically for gelation. When the mixtures would not visibly flow when inverted, they were considered to have gelled.

*Example 29*

|   | Gm. |
|---|---|
| Polypropyleneglycol (Niax L.G. 56) | 60 |
| Tolylenediisocyanate (Mondur TD-80) | 22 |
| Phosphinylhydrocarbyloxy antimony compound of Example 25 above | 6 |
| Silicone oil (Dow Corning 500 Fluid) | 4 |
| Water | 1.5 |

Upon addition of all ingredients except water, exothermic reaction was noted. Upon adding the water immediate foaming resulted. The resulting foam was considered flame retardant in that when a sample thereof was removed from a bunsen burner flame the burning polymer was self extinguishing.

*Example 30*

Repeating Example 29 except that no phosphinylhydrocarbyloxy antimony compound was used, no foaming or gelation resulted in one hour. At the end of one hour the mixture could be poured from the mold.

*Example 31*

The following ingredients were compounded in an attempt to make a polyurethane foam.

| Polypropyleneglycol (Niax L.G. 56) | gm | 60 |
|---|---|---|
| Silicon oil (Dow Corning 500 fluids) | gm | 4 |
| Tolylene isocyanate (Mondur TD 80) | gm | 22 |
| Activator Solution (15% by weight solution of triethyl amine in water) | ml | 1.5 |

No useful foam was obtained in 1 hour. At the end of 4 hours the mixture was gelled to a bubbly resin. No expansion occured.

The following table illustrates the effect on reaction time of adding varying amounts of one of the phosphinylhydrocarbyloxy antimony compounds, bis{1-[bis(2-chloropropoxy)phosphinyl]ethyl} chloroantimonite to a polyurethane foam-making reaction mixture. The procedure used for incorporating the antimony compound was as follows:

To 10 gms. of Niax L.G. 56 there was added varying amounts of the test compound. These materials were mixed well and then 0.77 cc. of Mondur TD 80 was added. The resulting mixture was agitated and divided into 2 portions in test tubes. One test portion was heated at 70° C. in an oil bath, and the other was kept at room temperature (28° C.).

TABLE I

| Wt. of ester (gms.) in foam formula | Percent of ester in formula | Gel Times (Minutes) | |
|---|---|---|---|
|   |   | 70° C. | 28° C. |
| 0.1 | 0.93 | 9.5 | 169 |
| 0.2 | 1.83 | 6.5 | 109 |
| 0.4 | 3.60 | 6.0 | 72 |
| 0.6 | 5.30 | 5.0 | 27 |
| 0.8 | 6.95 | 3.75 | 19 |
| 1.0 | 8.55 | 3.50 | 6 |
| 1.5 | 10.30 | 2.50 | 2.5 |

What is claimed is:

1. Esters of trivalent antimony acids having at least one phosphinylhydrocarbyloxy group, each of the remaining two valences of the antimony atom being satisfied by a member of the group consisting of a phosphinylhydrocarbyloxy group, bromine, chlorine, hydrogen, hydrocarbyl, hydrocarbyloxy, hydrocarbylthio radicals having from 1 to 20 carbon atoms, and said radicals having halogen substituents therein.

2. Compounds of the formula

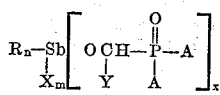

wherein $n$ is a whole number of from 0 to 2, $m$ is a whole number from 0 to 2, $x$ is a whole number from 1 to 3, and the sum total of $n+m+x$ is always equal to 3, R is selected from the group consisting of hydrogen, and hydrocarbyl, halohydrocarbyl, hydrocarbyloxy, halohydrocarbyloxy, hydrocarbylthio, and halohydrocarbylthio radicals of from 1 to 12 carbon atoms; X is selected from the group consisting of bromine and chlorine; Y is selected from the group consisting of hydrogen, hydrocarbyl radicals of from 1 to 17 carbon atoms, furyl, thienyl, and said radicals carrying a substituent selected from the group consisting of halogen, cyano-, alkyl, -O-alkyl, -S-alkyl, -COOalkyl, where alkyl has from 1 to 5 carbon atoms and

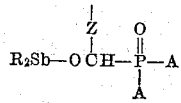

where Z is a bivalent hydrocarbylene radical having from 1 to 18 carbon atoms when $x$ is 1, and when $x$ is 2 to 3, Y is selected from the group consisting of hydrogen, hydrocarbyl radicals of from 1 to 11 carbon atoms, furyl, thienyl radicals, and said radicals carrying a substituent selected from the group consisting of halogen, cyano, -alkyl -O-alkyl, -S-alkyl, -COOalkyl, where alkyl has from 1 to 5 carbon atoms; and each A is selected from the group consisting of hydrocarbyl, hydrocarbyloxy, halohydrocarbyl and halohydrocarbyloxy radicals which contain from 1 to 12 carbon atoms.

3. Compounds of the formula

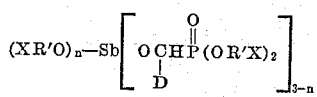

wherein $n$ is a whole number of from 0 to 2; X is selected from the group consisting of bromine and chlorine; each R' group is a hydrocarbyl radical of from 1 to 12 carbon atoms; D represents a hydrocarbyl radical having from 1 to 17 carbon atoms.

4. Compounds of the formula

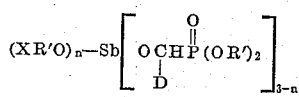

wherein $n$ is a whole number of from 0 to 2; X is selected from the group consisting of bromine and chlorine; each R' represents a hydrocarbyl radical of from 1 to 12 carbon atoms; D denotes a hydrocarbyl group having from 1 to 17 carbon atoms.

5. Compounds of the formula

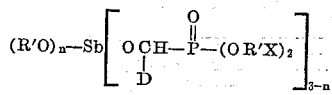

wherein $n$ is a whole number of from 0 to 2; X is selected from the group consisting of chlorine or bromine; each R' denotes a hydrocarbyl radical having from 1 to 12 carbon atoms; and D denotes a hydrocarbyl radical having from 1 to 17 carbon atoms.

6. Compounds of the formula

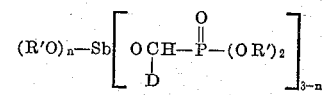

wherein $n$ is a whole number of from 0 to 2; each R' denotes a hydrocarbyl radical having from 1 to 12 carbon atoms; and D denotes a hydrocarbyl radical having from 1 to 17 carbon atoms.

7. Tris[1-(diethoxyphosphinyl)propyl] antimonite.
8. Bis{1 - [bis(2 - chloropropoxy)phosphinyl]ethyl}2-chloropropyl antimonite.
9. 1-(diethoxyphosphinyl)propyl dichloroantimonite.
10. Bis[1 - (diethoxyphosphinyl)ethyl] chloroantimonite.
11. Tris[1-(diethoxyphosphinyl)propyl] antimonite.
12. Bis[1-(diethoxyphosphinyl)propyl] 2-chloropropyl antimonite.
13. 1 - (dihexyloxyphosphinyl)propyl bis(2-chloropropyl) antimonite.
14. 1-[bis(2 - chloropropoxyphosphinyl)propyl] bis(2-chloropropyl) antimonite.
15. [1-(diethoxyphosphinyl)-6-methyl-3-cyclohexenylmethyl]bis(2-chloropropyl) antimonite.
16. [1-(diethoxyphosphinyl)-3-carboethoxypropyl] bis(2-chloropropyl) antimonite.
17. α-[(Diethoxyphosphinyl)-p-methoxybenzyl] bis(2-chloropropyl) antimonite.
18. α - [(Diethoxyphosphinyl) - 2-chlorobenzyl] bis(2-chloropropyl) antimonite.
19. α,α'-Bis(diethoxyphosphinyl)-p-xylylenyl α,α' - bis-[bis(2-chloropropyl) antimonite].
20. 1-[(ethoxyphenylphosphinyl)propyl] bis(2-chloropropyl) antimonite.
21. The method of preparing a phosphorus containing ester of a trivalent antimony acid which comprises reacting a trivalent antimony compound having from 1 to 3 halogen atoms selected from the group consisting of bromine and chlorine attached to the antimony atom, with an aldehyde having from 1 to 18 carbon atoms, and a trivalent phosphorus ester having at least one radical selected from the group consisting of alkoxy and haloalkoxy radicals having from 1 to 12 carbon atoms.
22. The method of preparing a phosphorus containing ester of a trivalent antimony acid which comprises contacting and reacting an antimony compound of the formula

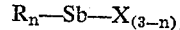

where $n$ is a whole number of from 0 to 2, X is selected from the group consisting of bromine and chlorine, and each R is selected from the group consisting of hydrogen, and hydrocarbyl, halohydrocarbyl, hydrocarbyloxy, halohydrocarbyloxy, hydrocarbylthio, and halohydrocarbylthio radicals having from 1 to 20 carbon atoms with an aldehyde having a generic formula selected from the group consisting of

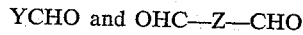

wherein Y is selected from the group consisting of hydrogen, hydrocarbyl radicals having from 1 to 17 carbon atoms, furfuryl, thienyl, and said radicals having as substituents therein halogen, -cyano, -alkyl, -O-alkyl, -S-alkyl, -COOalkyl where alkyl has from 1 to 5 carbon atoms when $n$ is 1 to 2, and when $n$ is 0, Y is selected from the group consisting of hydrogen, hydrocarbyl radicals having from 1 to 11 carbon atoms, furfury, thienyl, and said radicals having as substituents therein halogen, -alkyl, -O-alkyl, -S-alkyl, -COOalkyl where alkyl has from 1 to 5 carbon atoms; Z is a bivalent-hydrocarbylene-radical having from 1 to 18 carbon atoms; and a trivalent phosphorus ester having the general formula

wherein each A is selected from the group consisting of hydrocarbyl, halohydrocarbyl, hydrocarbyloxy, and halohydrocarbyloxy radicals having from 1 to 12 carbon atoms, and T is selected from the group consisting of alkyl and haloalkyl radicals having from 1 to 12 carbon atoms.

23. The method of preparing a halogen and phosphorus containing ester of a trivalent antimony acid which comprises contacting and reacting an antimony-halogen compound of the formula $$(XR'O)_n\text{---}SbX_{3-n}$$

wherein $n$ is a whole number of from 0 to 2; X is selected from the group consisting of bromine and chlorine; each R' is a hydrocarbyl radical having from 1 to 12 carbon atoms, with an aldehyde of the formula DCHO, wherein D denotes a hydrocarbyl radical having from 1 to 17 carbon atoms, and a trivalent phosphorus ester having the formula $$(XR'O)_2\text{---}P\text{---}OT$$

wherein X, and R' are as defined above, and T denotes a member selected from the group consisting of alkyl and haloalkyl radicals having from 1 to 12 carbon atoms.

24. The method of preparing a halogen and phosphorus containing ester of a trivalent antimony acid which comprises contacting and reacting an antimony-halogen compound of the formula $$(XR'O)_n\text{---}Sb\text{---}X_{3-n}$$

wherein $n$ is a whole number of from 0 to 2; X is selected from the group consisting of bromine and chlorine; each R' is a hydrocarbyl radical having from 1 to 12 carbon atoms, with an aldehyde of the formula, DCHO, where D is a hydrocarbyl radical of from 1 to 17 carbon atoms, and a trivalent phosphorus ester of the formula $$(R'O)_2\text{---}POT$$

wherein R' has the same definition as above, and T is selected from the group consisting of alkyl and haloalkyl radicals having from 1 to 12 carbon atoms.

25. The method of preparing a halogen and phosphorus containing ester of a trivalent antimony acid which comprises contacting and reacting an antimony-halogen compound of the formula $$(R'O)_nSbX_{3-n}$$

wherein $n$ is a whole number of from 0 to 2; each R' is a hydrocarbyl radical of from 1 to 12 carbon atoms, and X is selected from the group consisting of bromine and chlorine, with an aldehyde of the formula, DCHO, wherein D is a hydrocarbyl group having from 1 to 17 carbon atoms, and a trivalent phosphorus ester of the formula $$(XR'O)_2\text{---}P\text{---}OT$$

wherein X, and R' are as defined above, and T is selected from the group consisting of alkyl and haloalkyl radicals having from 1 to 12 carbon atoms.

26. The method of preparing a phosphorus containing ester of a trivalent antimony acid which comprises contacting and reacting an antimony-halogen compound of the formula $$(R'O)_n\text{---}SbX_{3-n}$$

wherein $n$ is a whole number of from 0 to 2; each R' is a hydrocarbyl radical having from 1 to 12 carbon atoms; X is selected from the group consisting of bromine and chlorine, with an aldehyde of the formula, DCHO, wherein D is a hydrocarbyl radical having from 1 to 17 carbon atoms, and a trivalent phosphorus ester of the formula $$(R'O)_2\text{---}P\text{---}OT$$

wherein R' is as defined above, and T is selected from the group consisting of alkyl and haloalkyl radicals having from 1 to 12 carbon atoms.

27. The method which comprises mixing antimony trichloride, propionaldehyde and triethyl phosphite and recovering from the resulting reaction mixture tris[1-(diethoxyphosphinyl)propyl] antimonite.

28. The method which comprises mixing 2-chloropropoxydichlorostibine, benzaldehyde, and tris(2-chloropropyl) phosphite and recovering from the resulting reaction mixture bis{α-[bis(2-chloropropoxy)phosphinyl]benzyl} 2-chloropropyl antimonite.

29. The method of preparing a phosphorus containing ester of a trivalent antimony acid which comprises contacting and reacting an antimony-halogen compound of the formula $$R_n\text{---}Sb\text{---}X_{3-n}$$

wherein $n$ is a whole number of from 0 to 2; R is selected from the group consisting of hydrogen, and hydrocarbyl, halohydrocarbyl, hydrocarbyloxy, halohydrocarbyloxy, hydrocarbylthio, and halohydrocarbylthio radicals having from 1 to 12 carbon atoms; and X is selected from the group consisting bromine and chlorine, with an α-hydroxy pentavalent phosphorus compound of the formula $$\underset{\underset{Y}{|}}{HO\text{---}CH}\text{---}\overset{\overset{O}{\|}}{\underset{\underset{A}{|}}{P}}\text{---}A$$

wherein Y is selected from the group consisting of hydrogen, hydrocarbyl radicals having from 1 to 17 carbon atoms furfuryl, thienyl, and said radicals carrying a substituent selected from the group consisting of halogen, cyano, -O-alkyl, -S-alkyl, -COOalkyl, where alkyl has from 1 to 5 carbon atoms, and $$\underset{\underset{A}{|}}{HO\overset{\overset{Z}{|}}{C}H}\text{---}\overset{\overset{O}{\|}}{P}\text{---}A$$

when $(3-n)$ equals 1, and when $(3-n)$ equals 2 to 3, Y is selected from the group consisting of hydrogen, hydrocarbyl radicals having from 1 to 11 carbon atoms, furyl, thienyl, said radicals carrying a substituent selected from the group consisting of halogen, cyano-, -alkyl-, -O-alkyl, -S-alkyl, -COOalkyl, where alkyl has from 1 to 5 carbon atoms; Z is a bivalent -hydrocarbylene- radical having from 1 to 18 carbon atoms; and each A is selected from the group consisting of hydrocarbyl, halohydrocarbyl, hydrocarbyloxy, and halohydrocarbyloxy radicals having from 1 to 12 carbon atoms in the presence of a basic material.

References Cited in the file of this patent

UNITED STATES PATENTS

| | | |
|---|---|---|
| 2,647,910 | Archer | Aug. 4, 1953 |
| 2,764,565 | Hoppe et al. | Sept. 25, 1956 |
| 2,839,554 | Haslam | June 17, 1958 |
| 2,850,467 | Livingood | Sept. 2, 1958 |